United States Patent
Nozawa et al.

(10) Patent No.: US 7,891,079 B2
(45) Date of Patent: Feb. 22, 2011

(54) MANUFACTURING APPARATUS OF A HEAD GIMBAL ASSEMBLY AND MANUFACTURING METHOD OF A HEAD GIMBAL ASSEMBLY

(75) Inventors: Hiroshi Nozawa, Kawasaki (JP); Yukio Kato, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/489,616

(22) Filed: Jun. 23, 2009

(65) Prior Publication Data
US 2009/0260225 A1 Oct. 22, 2009

Related U.S. Application Data

(63) Continuation of application No. PCT/JP2006/326184, filed on Dec. 28, 2006.

(51) Int. Cl.
G11B 5/127 (2006.01)
H04R 31/00 (2006.01)

(52) U.S. Cl. ............... 29/603.03; 29/603.04; 29/603.06; 29/603.07; 29/727; 29/737; 360/234.5; 360/245.8; 360/245.9; 360/264.2; 360/294.4

(58) Field of Classification Search ............... 29/603.03, 29/603.04, 603.06, 63.07, 729, 737; 360/234.5, 360/245.8, 245.9, 264.2, 294.4, 294.6
See application file for complete search history.

(56) References Cited

FOREIGN PATENT DOCUMENTS

| JP | A 60-189245 | 9/1985 |
|---|---|---|
| JP | A 63-177599 | 7/1988 |
| JP | A 9-307048 | 11/1997 |
| JP | A 10-244658 | 9/1998 |
| JP | A 2002-210517 | 7/2002 |
| JP | 2004034205 A * | 2/2004 |
| JP | A 2004-103173 | 4/2004 |

* cited by examiner

Primary Examiner—Paul D Kim
(74) Attorney, Agent, or Firm—Greer, Burns & Crain, Ltd.

(57) ABSTRACT

A bending apparatus of a head gimbal assembly includes a suction unit configured to attract the head gimbal assembly, a movement unit configured to move a long tail connected to a terminal part, a stopper against which the moved long tail is butted, a transmission type optical sensor configured to detect that the long tail is positioned to the stopper, a tail holder configured to hold a part of the long tail on a work table, a roller configured to compress the terminal part against the tail holder and to bend the terminal part relative to the long tail at a right angle, and a controller configured to control, based on a detection result of the transmission type optical sensor, a movement of the tail holder to the work table and a movement of the roller to the tail holder.

13 Claims, 18 Drawing Sheets

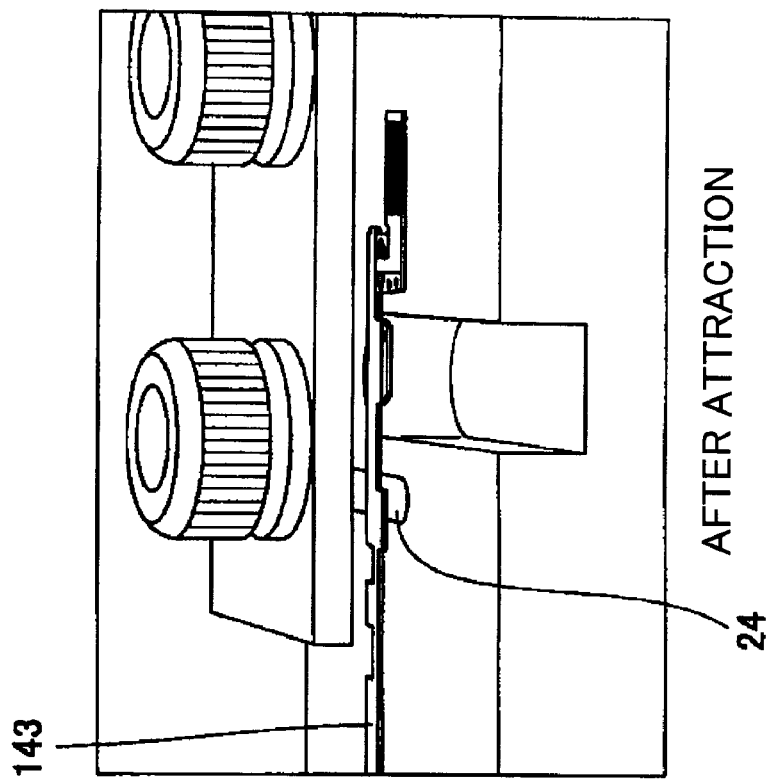
FIG. 6B AFTER ATTRACTION
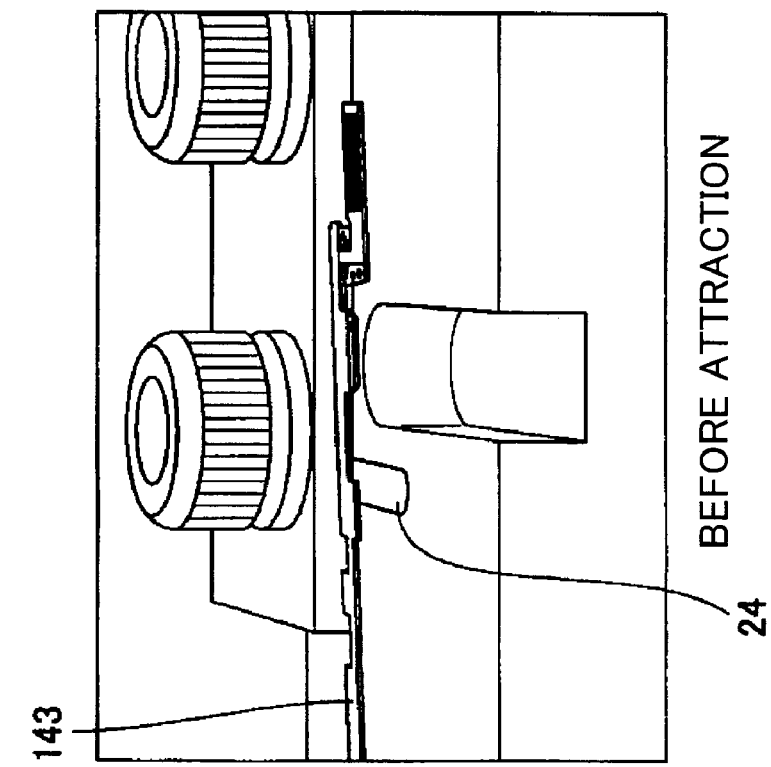
FIG. 6A BEFORE ATTRACTION

MANUFACTURING APPARATUS OF A HEAD GIMBAL ASSEMBLY AND MANUFACTURING METHOD OF A HEAD GIMBAL ASSEMBLY

This application is a continuation that claims the benefit of International Application No. PCT/JP2006/326184, filed Dec. 28, 2006, which is hereby incorporated by reference herein in its entirety.

BACKGROUND OF THE INVENTION

1. Field of the Invention

The present invention relates generally to a manufacturing apparatus of a head gimbal assembly ("HGA"), and more particularly to a bending apparatus of a terminal part of a long-tail suspension to be mounted onto a hard disc drive ("HDD"). Here, the HGA is a suspension assembly mounted with a magnetic head unit and a base plate, and also referred to as a head suspension assembly.

2. Description of the Related Art

The HDD typically includes a disc and a head stack assembly ("HSA") configured to support and move a head to a desired position on a disc. The HSA has includes a carriage (also referred to an "actuator," an "E block" having an E-shaped section, or an "actuator ("AC") block"), and a HGA attached to a support member of the carriage (referred to as an "arm" hereinafter). The magnetic head unit includes a micro head core (simply referred to as a "head" hereinafter) configured to record and reproduce a signal, and a slider configured to support the head. The base plate is swaged with the arm.

The suspension serves as a flat spring to compress the slider toward the disc at a predetermined compression force. As the disc rotates, airflow (air bearing) occurs between the slider and the disc along with the rotation, and floats the slider above the disc surface. The floating slider is spaced from the disc by a predetermined distance due to a balance between the floating force and the compression force. In this state, the arm swings to move or seek the head to the desired position on the disc for information reading and writing.

A long-tail suspension is used to satisfy the recent high-speed transfer demand. The long-tail suspension extends an end of a suspension substrate that is electrically connected to the head and fixed onto the suspension, to a main flexible printed circuit ("FPC") board that is fixed onto the carriage. The suspension substrate extends from the magnetic head unit along the center of the suspension in the longitudinal direction of the suspension, and is then bent by 90° toward the outside of the suspension. Next, the suspension substrate is again bent at its end by 90° along the side surface of the suspension, and forms an aerial part that extends in air near the side surfaces of the suspension and the arm. A section of the suspension substrate from the aerial part to the main FPC is generally referred to as a long tail. The suspension substrate has a wiring pattern on a SUS substrate via an insulation layer. Thereafter, a terminal part deflected by 90° from the long tail is soldered with the main FPC.

Prior art include Japanese Patent Laid-Open Nos. S63-177599, H09-307048, and S60-189245.

An alignment between each terminal on the terminal parts of the suspension substrate and a corresponding one of terminals of the main FPC is necessary for a connection between the long tail and the main FPC. However, the alignment becomes difficult when a bending angle shifts from 90° in bending the terminal part, or when the bent position shifts from the boundary between the long tail and the terminal part. The conventional terminal part requires totally four terminals, i.e., two recording terminals and two reproducing terminals for one head, whereas the recent terminal part requires two additional floatation-amount controlling terminals. In addition, the conventional size of the terminal part having these terminals is maintained due to the restrictions under the standard. Hence, both the suspension substrate and the main FPC need to install six terminals at the terminal part that has conventionally provided four terminals and both require a more precise alignment due to the decreases of inter-terminal pitches. Therefore, more precise bending of the terminal part becomes necessary.

SUMMARY OF THE INVENTION

The present invention provides a manufacturing apparatus configured to manufacture a HGA by precisely bending a terminal part of a suspension substrate.

A manufacturing apparatus according to one aspect of the present invention is configured to manufacture a HGA that includes a head configured to record information in and to reproduce the information from a recording medium, a suspension configured to support the head, and a suspension substrate fixed onto the suspension and connected electrically to the head at one end. The suspension substrate has a terminal part at another end. The manufacturing apparatus includes a work table used to bend the terminal part of the suspension substrate, a suction unit configured to attract the HGA, a movement unit configured to move a long tail connected to the terminal part of the suspension substrate, a stopper against which the long tail that has been moved by the movement unit is butted, a transmission type optical sensor configured to detect that the long tail is positioned relative to the stopper by determining whether light that passes a groove of 0.02 mm provided in the work table is shielded by the long tail, a tail holder configured to hold a part of the long tail on the work table, a roller configured to compress the terminal part against the tail holder and to bend the terminal part relative to the long tail at a right angle, and a controller configured to control, based on a detection result of the transmission type optical sensor, a movement of the tail holder to the work table and a movement of the roller to the tail holder. This manufacturing apparatus fixes the long tail and bends the terminal part with the roller, when the controller determines that the long tail is positioned relative to the stopper based on the detection result of the transmission type optical sensor. The transmission type optical sensor improves the bending precision, and the controller provides automatic and uniform bending. By detecting the groove of 0.02 mm, the bent portion can satisfy the demand under the standard that requires the bent part to be set within ±0.05 mm from the end of the long tail. A manufacturing method of the HGA also exhibits similar operations.

The HGA may further include a base plate configured to attach the suspension to an arm configured to drive the suspension. The manufacturing apparatus may further include a fixture block provided near the work table, and a pin provided to the fixture block and engaged with a boss hole in the base plate, wherein the suction unit has a first suction port around the pin and is configured to attract the base plate. The first suction port facilitates an engagement between the base plate and the pin.

The manufacturing apparatus may further include a pressure sensor configured to detect whether the base plate is mounted onto the first suction port, wherein the controller may start a bending operation when the pressure sensor detects that the base plate is mounted. This configuration provides bending when the base plate exists.

The movement unit includes, for example, a probe pin configured to contact the long tail at a pressure set by a compression spring, and an alignment block configured to move with the probe pin. The probe pin contacts the long tail with a preset compression force, and does not crush the long tail with the stopper.

The movement unit may include a projection configured to contact the long tail after the long tail is bent, and an alignment block configured to move with the projection. After bending, it is unnecessary to control the compression force to the long tail and thus a simple projection is sufficient rather than the probe pin. In addition, the structure becomes simpler than the probe pin, saving the space and the cost.

The suction unit may have a second suction port formed in the alignment block. The second suction port in the alignment block can reduce a warp of the long tail near the work table. Since the positioning precision of the long tail relative to the stopper improves, a bending throughput improves. In this case, the long tail may cross part of the second suction port when the second suction port attracts the long tail. When the long tail partially covers the second suction port, the long tail can be moved by the movement unit while the long tail is being attracted on the second suction port.

The stopper may be provided on the work table, wherein the suction unit has a third suction port formed in the work table near the stopper and the groove. The third suction port in the work table can reduce a warp of the long tail on the work table. Since the positioning precision of the long tail relative to the stopper improves, a bending throughput improves.

The manufacturing apparatus may further include a pressure sensor configured to detect whether the base plate is mounted onto the third suction port, wherein the controller approaches the tail holder to the work table when the pressure sensor detects the base plate. This configuration prevents bending when the groove is clogged by dust.

Each of the tail holder and the roller may be made of nonmagnetic cemented carbide. The nonmagnetic material can prevent negative influence on the head, and the cemented carbide material can maintain an optimal bending state while preventing cutting and abrasions in the bending time.

The manufacturing apparatus may further include a first cam mechanism configured to move the movement unit relative to the work table, the first cam including a first cam, a first drive shaft connected to the first cam, and a first guide engaged with the first cam and configured to change a position of the first cam, a second cam mechanism configured to move the tail holder relative to the work table, the second cam including a second cam, a second drive shaft connected to the second cam, and a second guide engaged with the second cam and configured to change a position of the second cam, a third cam mechanism configured to move the roller relative to the work table, the third cam including a third cam, a third drive shaft connected to the third cam, and a third guide engaged with the third cam and configured to change a position of the third cam, a direct acting motor, and a drive plate driven by the direct acting motor in one direction, wherein the first guide, the second guide, and the third guide are mounted onto the drive plate, and simultaneously moved in the same direction by the direct acting motor. When the drive plate moves in one direction, the timings of the three cam mechanisms are mechanically maintained. Since a means for detecting a state of each cam mechanism, a separate driving means, and a timing control become unnecessary, a structure of the manufacturing apparatus becomes simpler.

The controller may stop driving the roller for a predetermined time period while the roller is being pressed against the tail holder. Thereby, the bending state of the terminal part becomes stable.

Further features of the present invention will become apparent from the following description of exemplary embodiments (with reference to the attached drawings).

BRIEF DESCRIPTION OF THE DRAWINGS

FIG. 6A is a side view showing a warp state of the long tail before the long tail is attracted, and FIG. 6B is a side view showing a warp state of the long tail after the long tail is attracted.

DESCRIPTION OF THE EMBODIMENTS

Figure 1:
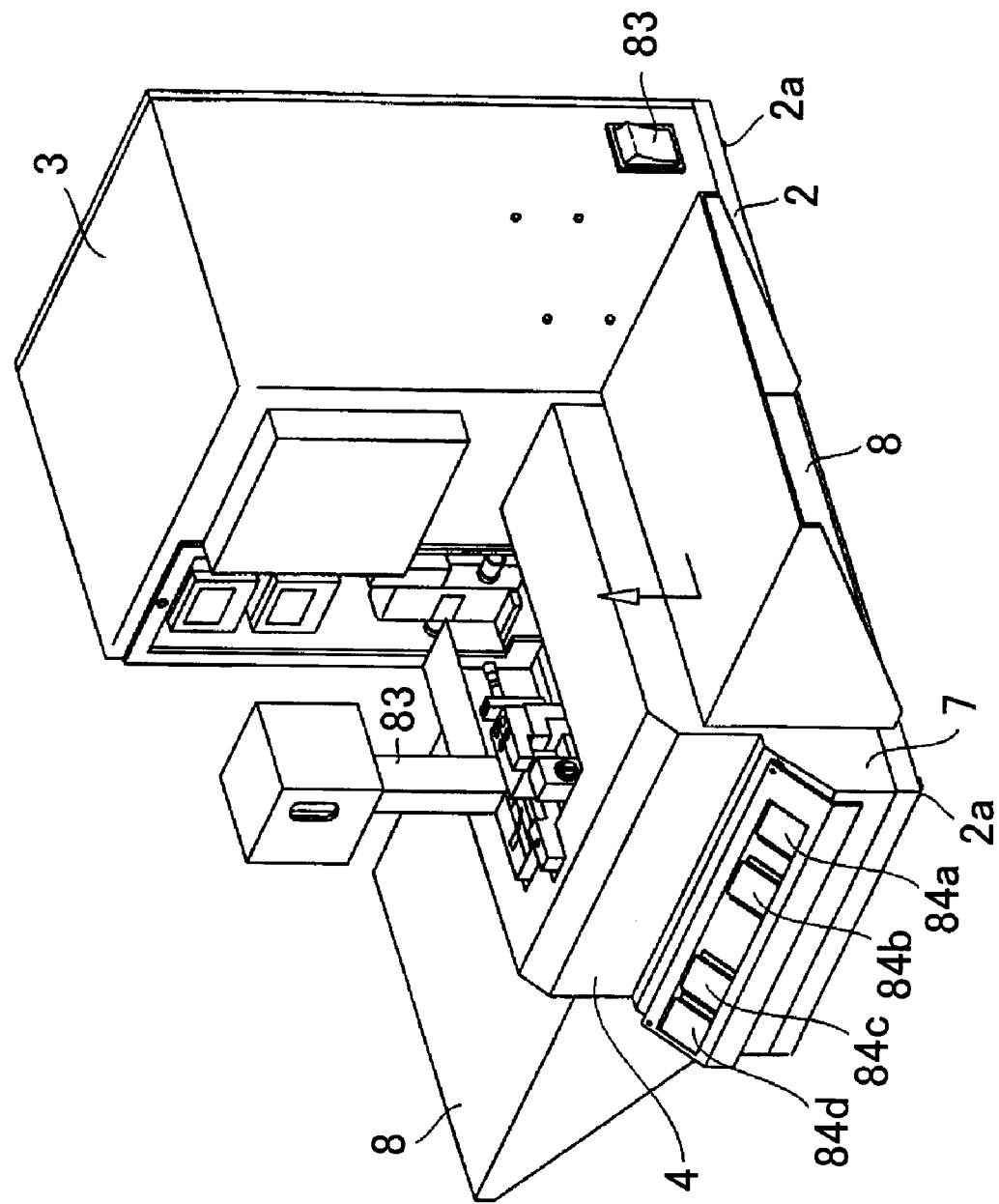
FIG. 1 is a perspective view of a bending apparatus according to one aspect of the present invention.
Figure 2:
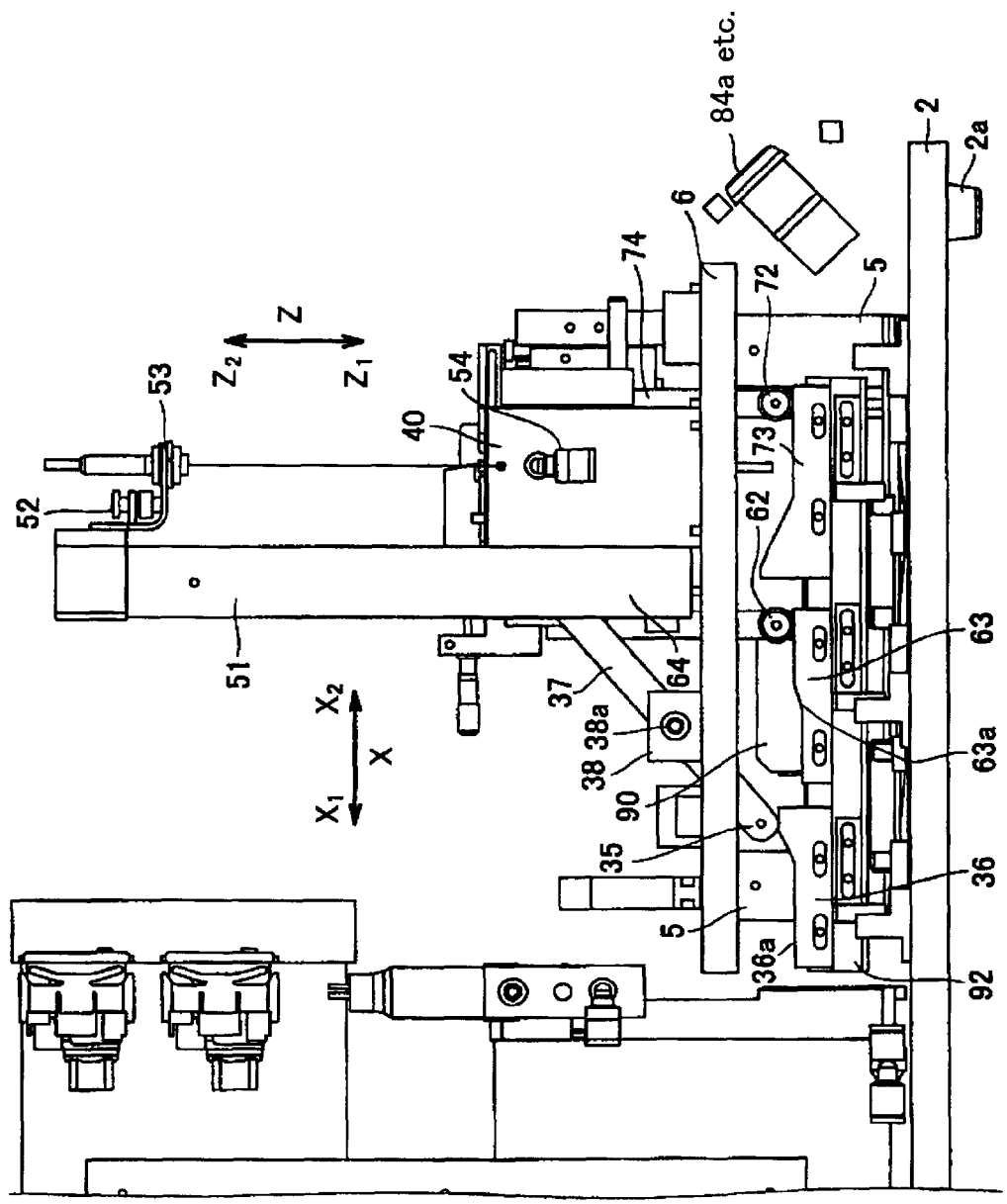
FIG. 2 is a partially sectional view of the bending apparatus shown in FIG. 1.

Referring now to the accompanying drawings, a description will be given of the bending apparatus (HGA manufacturing apparatus) 1 according to one embodiment of the present invention. Here, FIG. 1 is a perspective view of the bending apparatus 1. FIG. 2 is a partially sectional view of the bending apparatus 1. The bending apparatus 1 is a HGA manufacturing apparatus configured to manufacture a HGA 110 by automatically bending a terminal part 148 of a suspension substrate 140. The bending apparatus 1 includes, as shown in FIGS. 1 and 2, a control unit 3, a work part, a console 7, and a pair of vanes 8 on a base 2.

The base 2 is placed on a floor, and supports each part of the bending part 1. The base 2 is a flat plate member having a comparatively thin rectangular parallelepiped shape, and has cylindrical legs 2a at four corners on its bottom surface. The control unit 3 is an approximately rectangular parallelepiped housing, and has a power switch 83 of a control system 80, which will be described later, on its side surface, and a principal part of the control system in its inside.

The work part is a place used to bend the HGA 110. As shown in FIGS. 1 and 2, the work part has a cover 4, a plurality of pillars 5, a horizontal plate 6, and a variety of types of members, which will be described later.

The cover 4 is a U-shaped plate member configured to expose a work table 40 and its neighborhood and to cover other members, and provided on the base 2. Although FIG. 2 shows two pillars 5, there are actually four pillars 5. The pillars 5 stand at four corners on the rectangular horizontal plate 6 between the base 2 and the horizontal plate 6, and support the horizontal plate 6. The horizontal plate 6 is a plate member parallel to the base 2 having a comparatively thin rectangular parallelepiped shape, and a principal part of a driving system (such as a direct acting motor 90, a drive plate 92, and a variety of guides) under the horizontal plate 6.

The console 7 is provided on the front side of the cover 4, and has a variety of switches of the control system 80. FIG. 2 shows only one of the switches (such as 84a). A pair of vanes 8 is ancillary tables provided on both sides of the cover 4. For example, a box that houses many pre-processed HGAs 110 and tweezers used to pickup each HGA 110 are provided on the left vane 8. A box that houses post-processed HGAs 110 are provided, for example, on the right vane 8. In this case, an operator picks up and sets the HGA 110 out of the box on the left vane 8 via the tweezers, and puts each post-processed HGA 110 in the box on the right vane 8.

A description will now be given of each type of component provided in the work part. As shown in FIGS. 2 to 5, the work part includes a fixture block 10, a pin 16, a suction unit 20 (shown in FIG. 13), a movement unit 30, a work table 40, a stopper 42, a detector 50, a fixture unit 60, a bending unit 70, and a control system 80.

Figure 3:
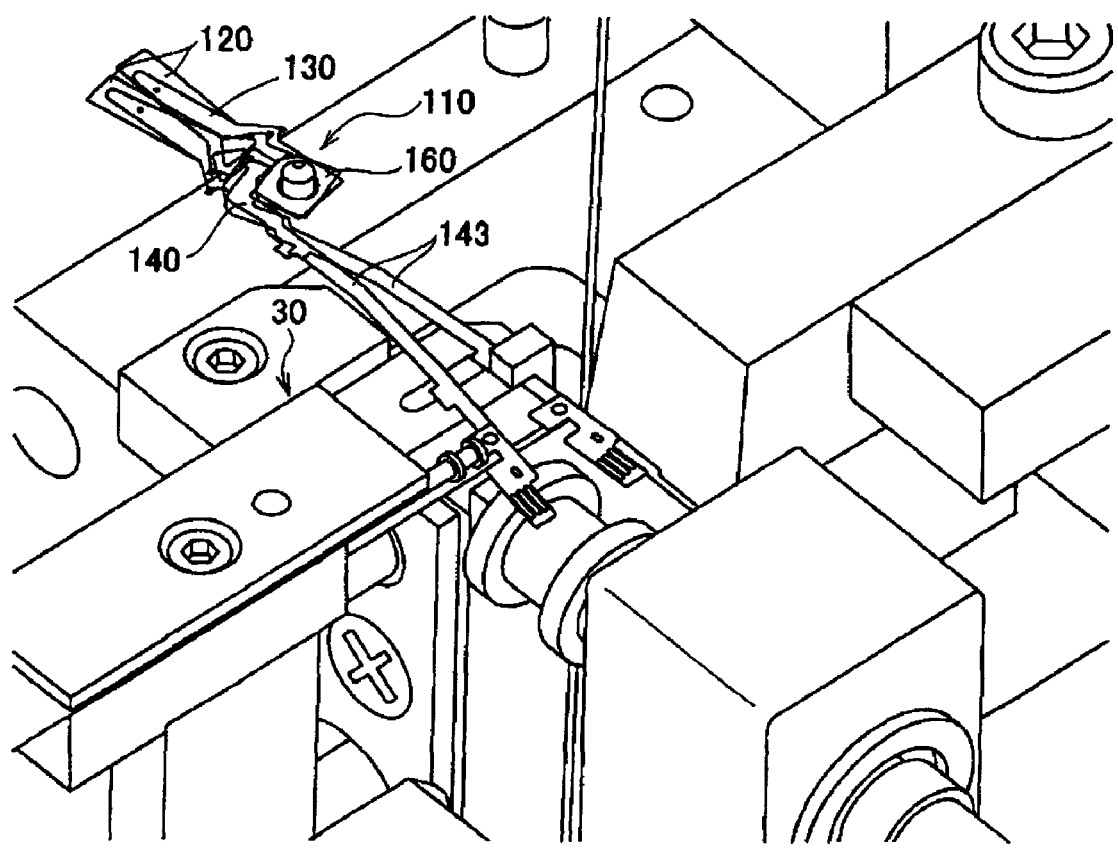
FIG. 3 is a perspective view just when an HGA is attached to the bending apparatus shown in FIG. 1 and after the HGA is positioned to the bending apparatus.
Figure 4:
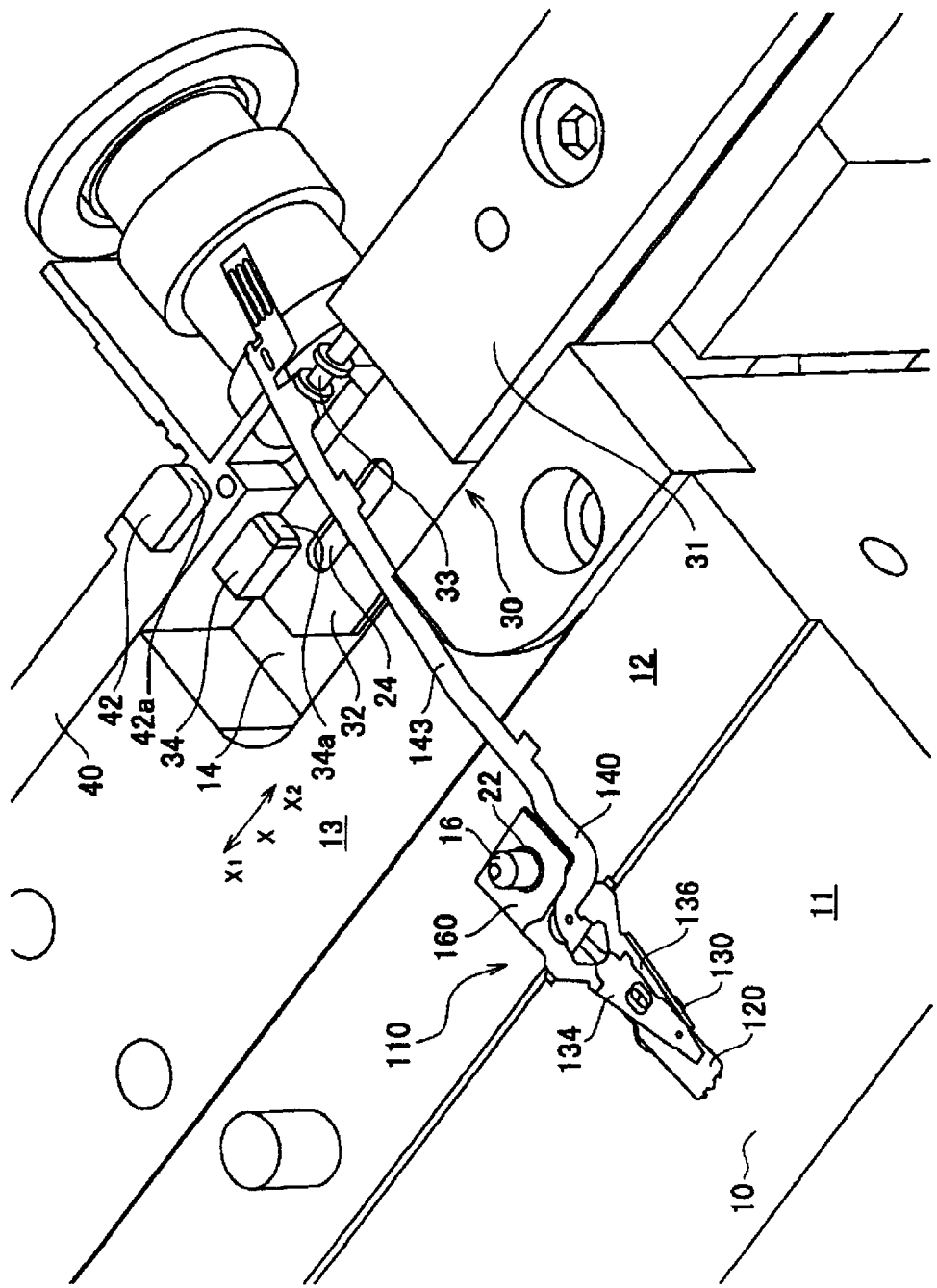
FIG. 4 is an enlarged perspective view just when the HGA is attached to the bending apparatus shown in FIG. 3.
Figure 5:
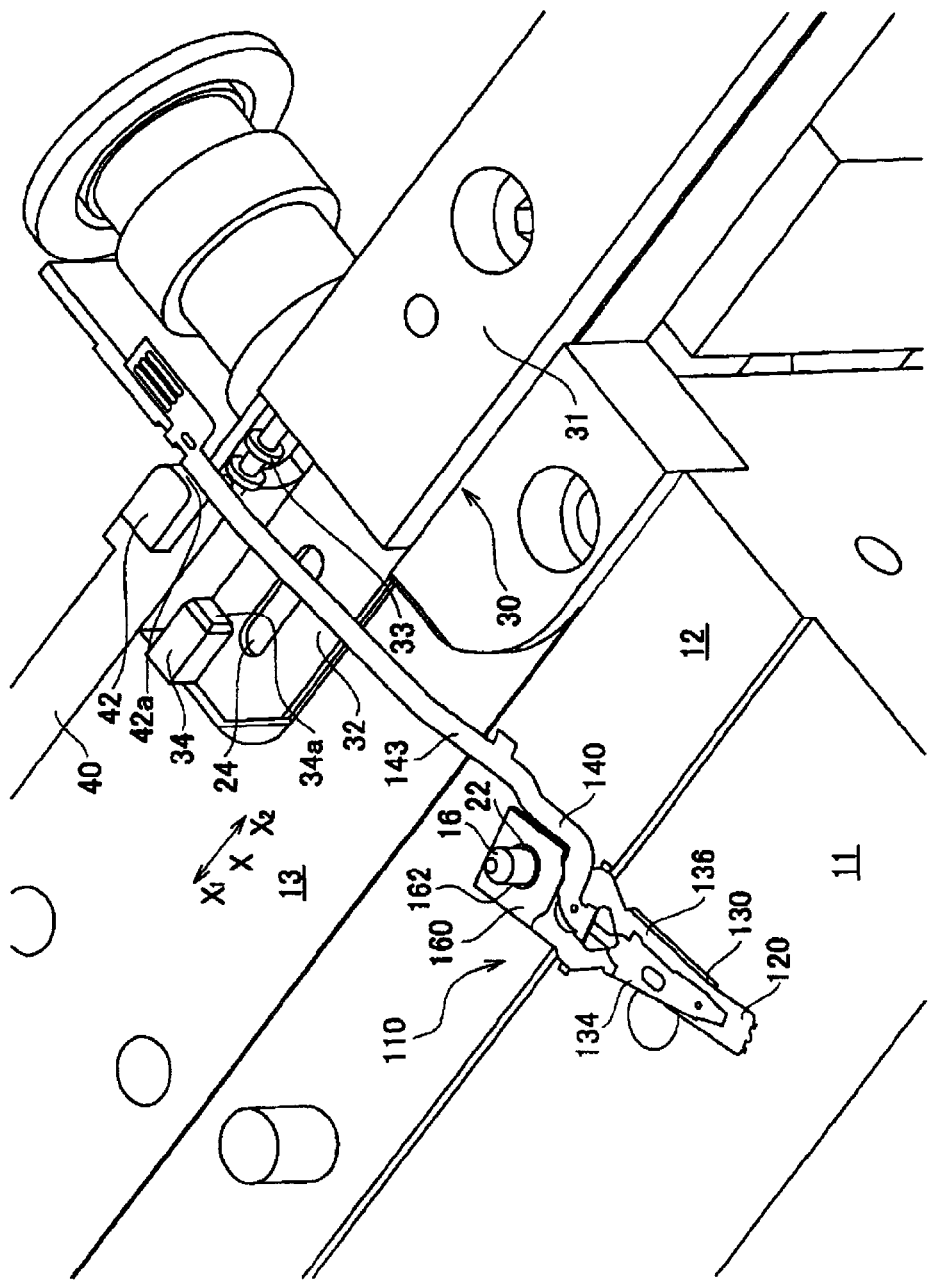
FIG. 5 is an enlarged perspective view after the HGA is positioned to the bending apparatus shown in FIG. 3.

Here, FIG. 3 is a perspective view showing just after the HGA 110 is attached to the bending apparatus 1 and after the HGA 110 is positioned to the bending apparatus 1. FIG. 4 is an enlarged perspective view just when the HGA 110 is attached to the bending apparatus 1. FIG. 5 is an enlarged perspective view after the HGA 110 is positioned to the bending apparatus 1 shown in FIG. 3.

While the fixture block 10 has an approximately rectangular parallelepiped shape, and includes several steps, as shown in FIGS. 4 and 5. The fixture block 10 has a concave 11, a convex 12, a convex 13, a concave 14, and a pin 16.

The concave 11 is lower than the convex 12 so as to prevent the surface of the suspension 130 from contacting the fixture block 10 and getting damaged. In FIGS. 4 and 5, the magnetic head unit 120 is provided on the front side, and the front surface of the suspension 130 is opposite to a surface of the suspension 130, onto which the magnetic head 120 is mounted.

The convex 12 is provided with the pin 16. The pin 16 is inserted into a boss hole 162 in a base plate 160 of the HGA 110, and rotatably fixes the HGA 110. In this embodiment, reference numeral 162 denotes the boss or the boss hole at center of the boss. An annular suction port 22, which will be described later, is provided around the pin 16. The bending apparatus 1 thus effectively utilizes the boss 162 of the base plate 160, which is originally provided to the HGA 110. A resin cushion (not shown) is arranged around the pin 16 so as to prevent the base plate 160 from getting damaged.

Since there is the above cushion, and the suspension substrate 140 is arranged on the base plate 160, the convex 13 is higher than the convex 12. The movement unit 30 is movably housed in the concave 14.

The suction unit 20 serves to attract the HGA 110, and has suction ports 22 to 26, and an exhaust unit 28.

The suction port 22 has an annular shape and is provided around the pin 16. An engagement between the pin 16 and the boss hole 162 of the base plate 160 using the tweezers is difficult since both members are small and the fitting is small. When the suction port 22 attracts the base plate 160, the pin 16 can be easily inserted into the boss hole 162 and the insertion operation becomes easier.

The suction hole 24 has an oval shape that extends in the X direction, and is formed at the center of a return block 32 of the movement unit 30. As shown in FIGS. 6A and 6B, the suction port 24 can lower a warp of the long tail 143 near the work table 40. Here, FIGS. 6A and 6B are side views showing a result of the warp correction experiments. More specifically, FIG. 6A is a side view of a warp state of the long tail 143 before the long tail 143 is attracted, and FIG. 6B is a side view of a warp state of the long tail 143 after the long tail 143 is attracted. Since the positioning precision of the long tail 143 relative to the stopper 42 improves, a time period from mounting the HGA 110 to starting the bending is shortened and a bending throughput improves.

When the suction port 24 attracts the long tail 143, as shown in FIGS. 4 and 5, the long tail 143 crosses a part of the suction port 24 and does not completely cover the suction port 24. Thus, when the long tail 143 partially covers the suction port 24, the long tail 143 can be moved by the movement unit 30 while attracted onto the suction port 24. As long as the long tail 143 does not completely cover the suction port 24, an extending direction of the suction port 24 is not limited to the X direction and the suction port 24 may be formed in the convex 13.

Figure 8:
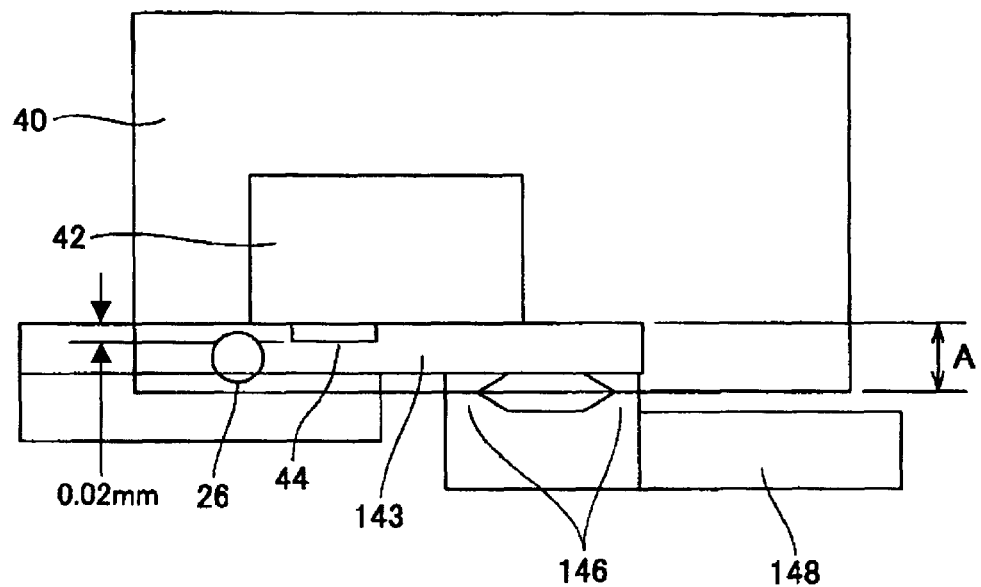
FIG. 8 is a transparent plane view of the state shown in FIG. 7.

The suction port 26 is formed in the work table 40, as shown in FIG. 8, which will be described later, and has a circular shape having a diameter of 0.8 mm. When the work table 40 has the suction port 26, a warp of the long tail 143 can be reduced on the work table 40. Since the positioning precision of the long tail 143 relative to the stopper 42 improves, a time period from mounting the HGA 110 to starting the bending can be shortened and a bending throughput improves. Different from the suction port 24, the long tail 143 does not have to move across the suction port 26, and completely covers the suction port 26 once it is positioned.

Although the exhaust unit 28 (shown in FIG. 13) is comply used for all the suction ports 22, 24, and 26 in this embodiment, one or more of these suction ports may be connected with a different exhaust port. A controller 81 controls starting and stopping of the suction by the exhaust unit 28. The exhaust unit 28 is connected to the suction ports 22 to 26, and attracts the HGA 110, more specifically, the base plate 160 or the long tail 143.

The movement unit 30 moves the long tail 143, positions the pre-bent long tail 143 to a work position, and moves the post-bent long tail 143 from the bending position, and releases it from the suction by the suction port 26. The movement unit 30 includes an alignment block 31, a return block 32, a probe pin 33, a return projection 34, and an alignment block driving mechanism.

The alignment block 31 is connected to the alignment block driving mechanism, and can be moved in the X direction shown in FIGS. 4 and 5.

The alignment block 31 is coupled with the return block 32. A return projection 34 is formed at the tip of the return block 32 on the $X_1$ side. The probe pin 33 projects from the alignment block 31, and is forced in the $X_1$ direction, shown in FIGS. 4 and 5, by a compression spring (not shown) provided in the alignment block 31. The return projection 34 contacts the long tail 143 at a front surface 34a when the alignment block 31 moves in an $X_2$ direction. The long tail 143 is arranged between the probe pin 33 and the return projection 34. When the probe pint 33 contacts the long tail 143 and the alignment block 31 moves, the return projection 34 does not contact the long tail 143. When the return projection 34 contacts the long tail 143 and the alignment block 31 moves, the probe pin 33 does not contact the long tail 143.

The alignment block driving mechanism includes, as shown in FIG. 2, a direct acting motor 90, a drive plate 92, a cam 35, a guide 36, a drive shaft 37, and a fulcrum unit 38. The cam 35 contacts the surface of the guide 36 through its cylindrical contour.

The direct acting motor 90 is a motor configured to drive the drive plate 92 in the X direction shown in FIG. 2. The drive plate 92 is a flat plate member parallel to the base 2 having a comparatively thin rectangular parallelepiped shape, and is movably provided in the X direction between the horizontal plate 6 and the base 2. The direct acting motor 90 and the drive plate 92 are commonly used for a tail holder driving mechanism and a roller driving mechanism, as described later. When the drive plate 92 moves in one direction (X direction), the timings of these three driving mechanism are mechanically maintained. Since a means for detecting a state of each cam mechanism, a separate driving means, and a timing control become unnecessary, a structure of the bending apparatus 1 becomes simpler.

The guide 36 has a guide surface 36a that is engaged with the cam 35, and displaces a position of the cam 35. The cam 35 that is located at an origin position shown in FIG. 2 is located at the highest position on the guide surface 36a, and as the drive plate 92 moves in the $X_2$ direction it moves to a lower position of the guide surface 36a.

The drive shaft 37 is connected to the cam 35 at its one end, and to the alignment block 31 at its other end. The drive shaft 37 is connected to the fulcrum unit 38 at an approximately midpoint. The fulcrum unit 38 has a shaft 38a that extends perpendicular to the paper plane shown in FIG. 2, and perforates through the drive shaft 37. The fulcrum unit 38 is fixed onto the horizontal plate 6, and the shaft 38a does not displace in the Z direction. As a result, the drive shaft 37 rotates around the shaft 38a. More specifically, as the cam 35 descends along the guide surface 36a, the drive shaft 37 rotates counterclockwise shown in FIG. 2. As a result, the alignment block 31 coupled with the other end of the drive shaft 37 moves in the $X_1$ direction.

The work table 40 serves to fix part of the HGA 110 in cooperation with the fixture unit 60 so as to bend the terminal part 148 of the suspension substrate 140. The work table 40 is a rectangular parallelepiped table provided on the horizontal plate 6.

Figure 7:
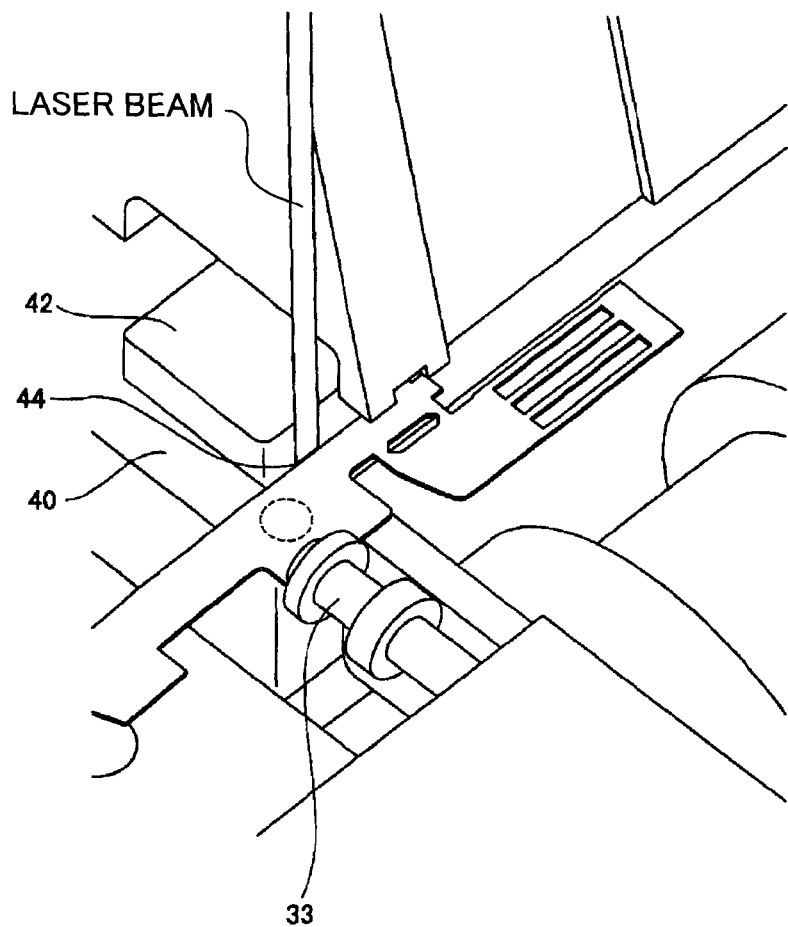
FIG. 7 is a partially enlarged perspective view of the state shown in FIG. 5.

As shown in FIGS. 4, 5, and 7, a rectangular parallelepiped stopper 42 is provided onto the work table 40. Here, FIG. 7 is a perspective view near the stopper 42 shown in FIG. 5. The stopper 42 is a rectangular parallelepiped projection having a front surface 42a against which the long tail 143 moved by the movement unit 30 is butted.

As shown in FIGS. 7 and 8, a groove 44 having 0.02 mm×0.5 mm is formed before the stopper 42 of the work table 40. FIG. 8 is a transparent plane view of FIG. 7. The groove 44 constitutes part of the detector 50. The suction port 26 is provided near the groove 44 and the stopper 42 of the work table 40. As shown in FIG. 8, a pair of bent parts (or nails) 146 is formed at the boundary between the long tail 143 and the terminal part 148.

The detector 50 detects whether the long tail 143 is positioned to the stopper 30. The detector 50 includes, as shown in FIGS. 2 and 7, a prop 51 attached to the horizontal plate 6, a laser 53 fixed onto the prop 51 via a fixture unit 52, and a light receiving part 54 configured to receive a laser beam from the laser 53 via the groove 44. This transmission type photo detector (53, 54) can improve the bending precision. In particular, by detecting the groove 44 of 0.02 mm, a demand under the standard that requires the bent parts 146 to be set from the end of the long tail 143 within a distance A of ±0.05 mm can be satisfied. While this embodiment sets a width of the groove to 0.02 mm so as to satisfy the standard of the range of ±0.05 mm, the width can be properly adjusted in accordance with the required precision.

Figure 13:
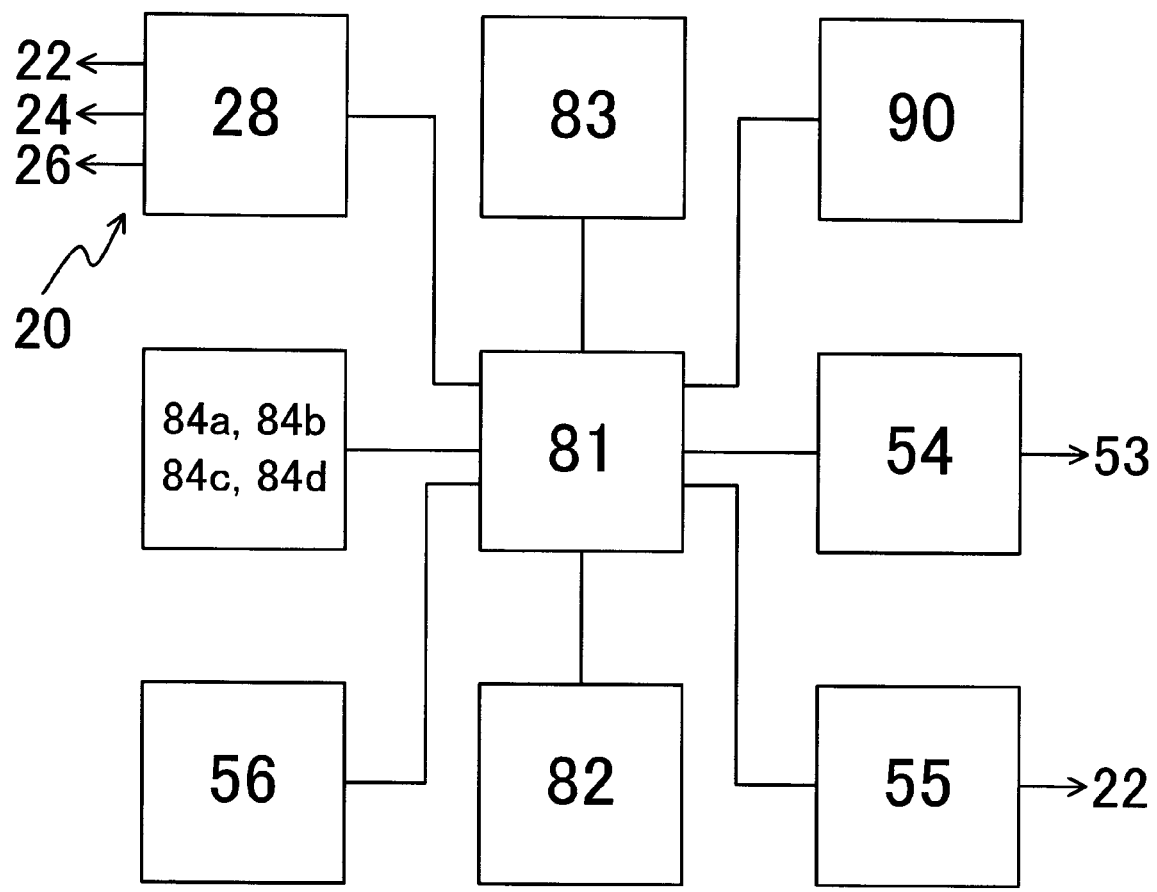
FIG. 13 is a block diagram of a control system of the bending apparatus shown in FIG. 1.

FIG. 8 shows the distance A. The light receiving part 54 is connected to the controller 81, as shown in FIG. 13, and informs a detection result to the controller 81.

The detector 50 further includes a pressure sensor 55 and detects whether the base plate 160 is attached to the suction port 22. Moreover, the detector 50 further includes a pressure sensor 56 and detects whether the long tail 143 is attracted onto the suction port 26. The pressure sensors 55 and 56 are connected to the controller 81, as shown in FIG. 13, and inform detection results to the controller 81.

The fixture unit 60 serves to press and fix a part of the long tail 143 against the work table 40, and includes a tail holder 61 and a tail holder driving mechanism.

Figures 10A, 10B, 10C:
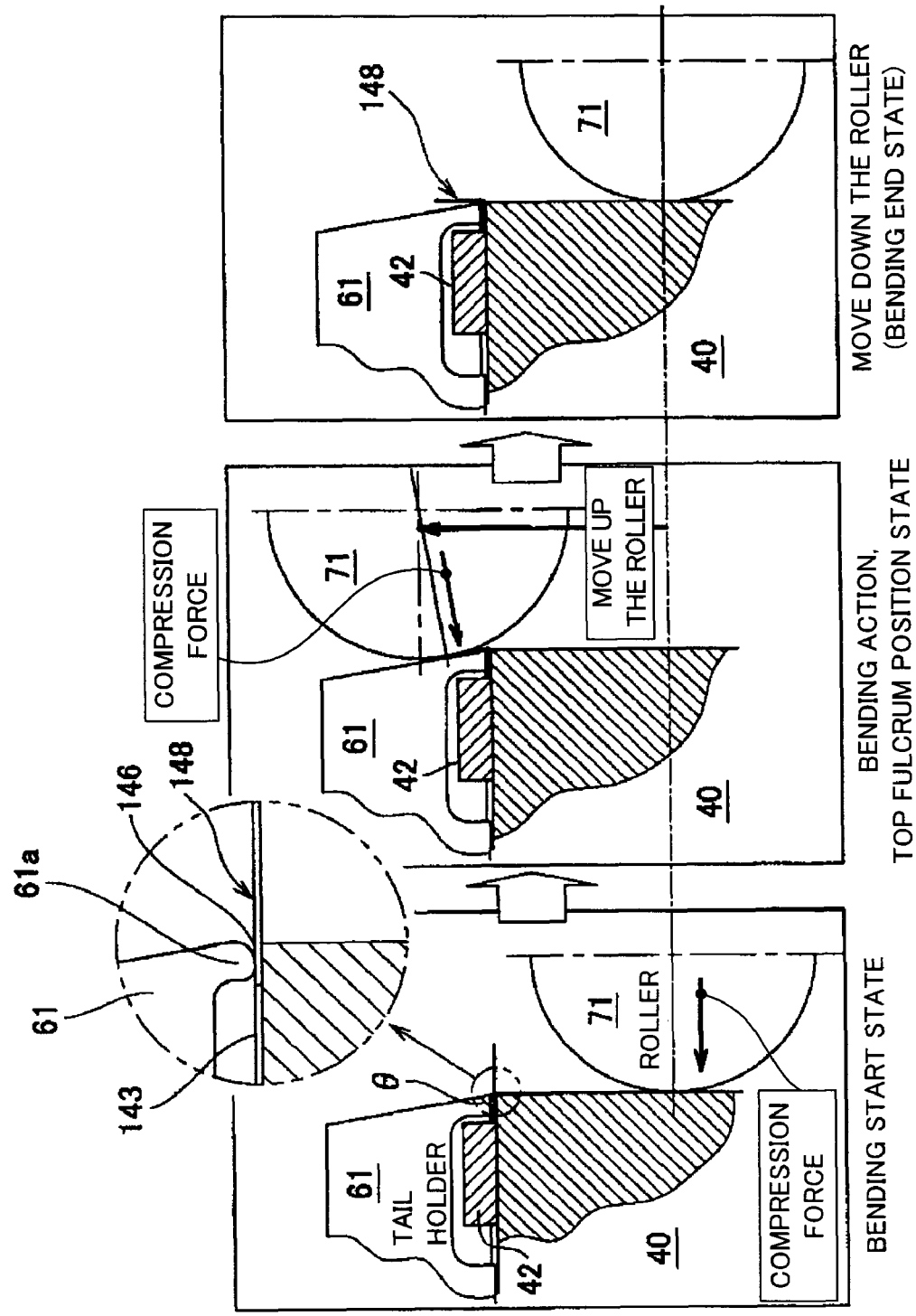
FIGS. 10A-10C are schematic sectional views showing a roller, a terminal part, and a tail holder before, during, and after the bending.

The tail holder 61 has an ingot shape whose inclination angle θ is set to an angle between 75° and 85° to the work table 40, as shown in FIGS. 10A to 10C. Here, FIGS. 10A to 10C are schematic sectional views showing states of the roller 71, the terminal part 148, and the tail holder 61 before, during, and after the bending.

If the inclination angle θ is 90° and the roller 71 is separated, an angle between the terminal part 148 and the long tail 143 becomes an acute angle due to the spring back. For bending to set an angle between the terminal part 148 and the long tail 143 to a right angle, it is necessary to set an angle between the terminal part 148 and the long tail 143 to an obtuse angle at the bending time (or to set the inclination angle θ to an acute angle).

If the inclination angle θ is greater than 85°, an angle between the bent terminal part 148 and the long tail 143 is likely to be an acute angle. If the inclination angle θ is smaller than 75°, an angle the bent terminal part 148 and the long tail 143 is likely to be an obtuse angle.

An edge 61a having the inclination angle θ has a curvature from 0.04 mm to 0.08 mm. In addition, the edge 61a needs to be smooth due to the curvature. If the curvature of the edge 61a is smaller than 0.04 mm, the edge 61 becomes so sharp that it may cut or damage the terminal part 148 at the bending time. If the curvature of the corner 61a is greater than 0.08 mm, the bent terminal part 148 is likely to warp instead of extending at the right angle.

The tail holder 61 is made of nonmagnetic cemented carbide. The nonmagnetic tail holder 61 does not negatively affect the head 122 magnetically. The cemented carbide tail holder 61 can maintain an optimal bending state while preventing cutting and abrasions in the bending time. In particular, it can maintain the curvature and the inclination angle θ of the above corner 61a through repetitive bending operations.

Figure 11:
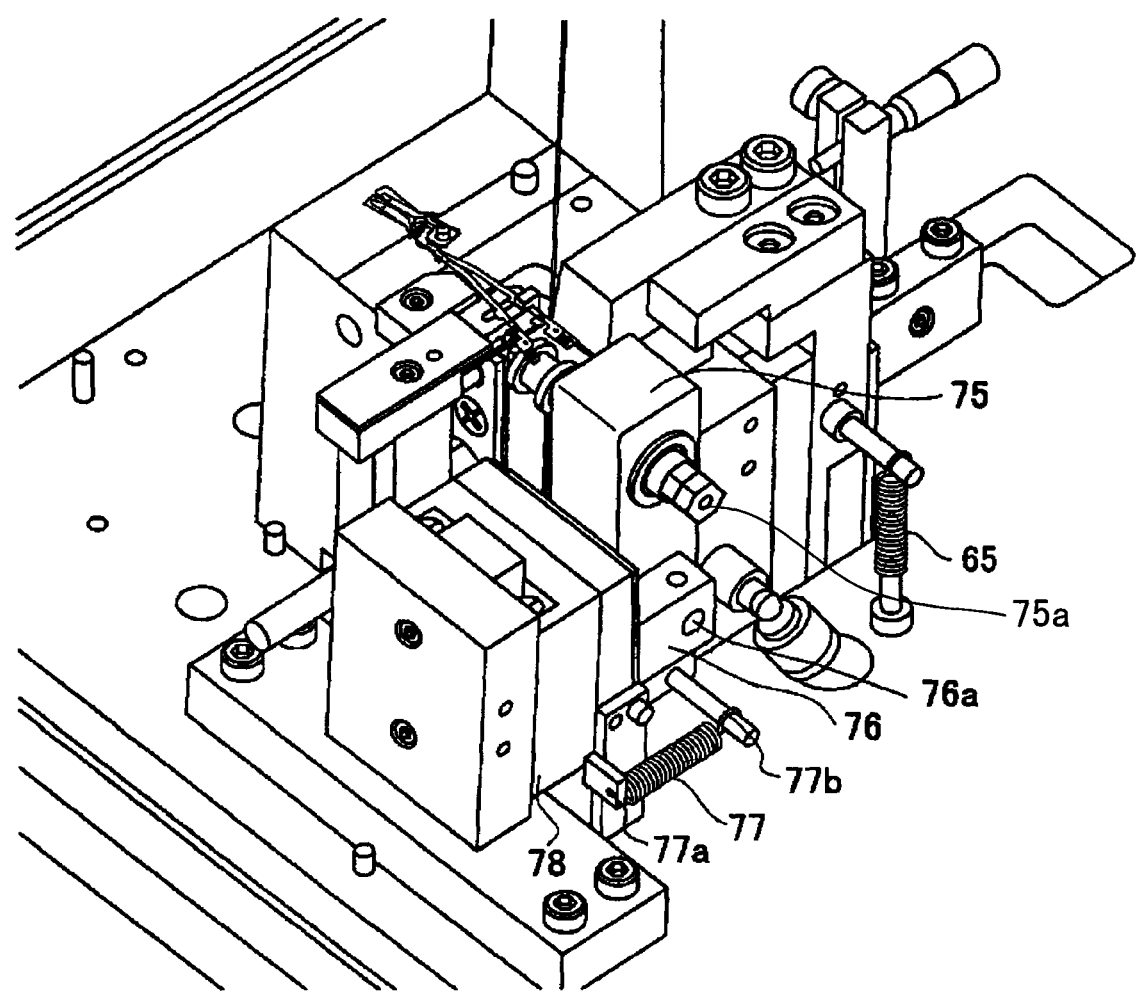
FIG. 11 is a perspective view showing the tail holder and a press spring of the roller shown in FIGS. 10A-10C.

The tail holder driving mechanism includes, as shown in FIG. 2, the direct acting motor 90, the drive plate 92, a cam 62, a guide 63, a drive shaft 64, and a press spring 65 shown in FIG. 11. The cam 62 has a cylindrical shape, and contacts the surface of the guide 63. The guide 63 has a guide surface 63a that is engaged with the cam 62 and displaces a position of the cam 62. The drive shaft 64 is connected to the cam 62 at its one end, and to the tail holder 61 at the other end. The pressure spring 65 is a tension spring that is engaged with the horizontal plate 6 at its one end, and the block connected to the tail holder 61 or the drive shaft 64. As a result, the drive shaft 64 can be moved along the Z position ($Z_1$-$Z_2$ direction), and is forced by the pressure sprig 65 in the $Z_1$ direction.

Figure 9:
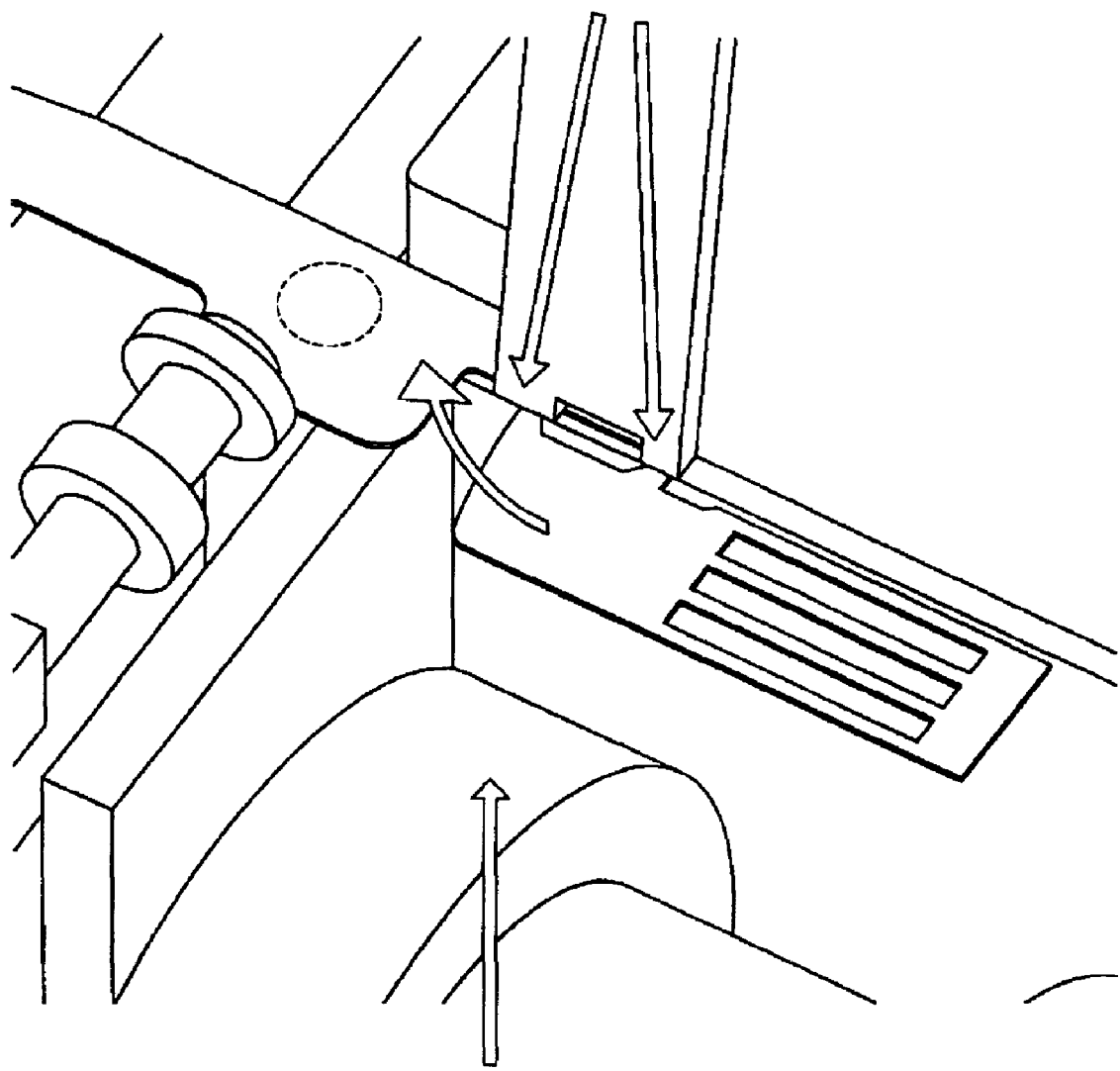
FIG. 9 is a perspective view showing that the positioned HGA is pressed against the tail holder.

The bending unit 70 presses the terminal part 148 against the tail holder 61, as shown in FIGS. 9 to 10C, bends the terminal part 148 at the right angle relative to the long tail 143, and includes the roller 71 and a roller driving mechanism.

The roller 71 is made of nonmagnetic cemented carbide. The nonmagnetic roller 71 does not negatively affect the head 122 magnetically. The cemented carbide tail holder 71 can maintain an optimal bending state while preventing cutting and abrasions in the bending time.

The roller driving mechanism includes, as shown in FIG. 2, the direct acting motor 90, the drive plate 92, a cam 72, a guide 73, a drive shaft 74, a block 75 shown in FIG. 11, a fulcrum unit 76, a pressure spring 77, and a block 78.

The cam 72 has a cylindrical shape, and contacts the surface of the guide 73. The guide 73 has a guide surface 73a that is engaged with the cam 72 and configured to displace a position of the cam 72. The drive shaft 74 is connected to the cam 72 at its one end, and to the roller 71 at its other end. The block 75 is connected to the roller 71 via a shaft 75a. The fulcrum unit 76 has a shaft 76a that makes the block 75 rotatable. The pressure spring 77 is a tension spring that has one end 77a engaged with the block 78 fixed onto the horizontal plate 6, and the other end 77b connected to the block 75 connected to the roller 71 at a position lower than the shaft 76a. As a result, the drive shaft 74 can be moved along the Z direction ($Z_1$-$Z_2$ direction), and the roller 71 is forced by the press spring 77 to the side of the tail holder 61 (to the deep side of the paper plane shown in FIG. 2) or as shown in FIGS. 10A to 10C.

Figure 12:
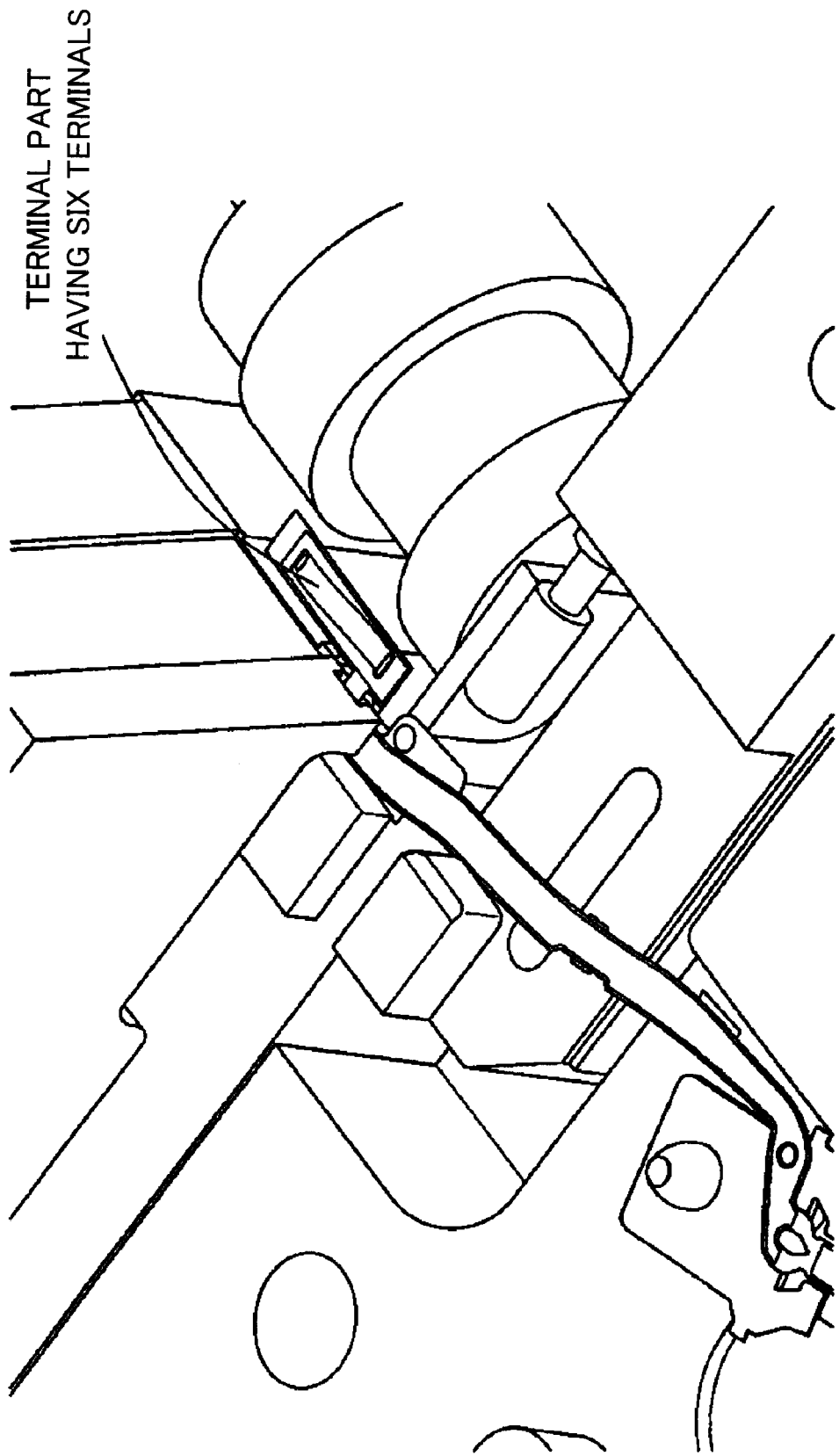
FIG. 12 is a perspective view corresponding to FIG. 9 in bending a terminal part having six terminals.
Figure 19B:
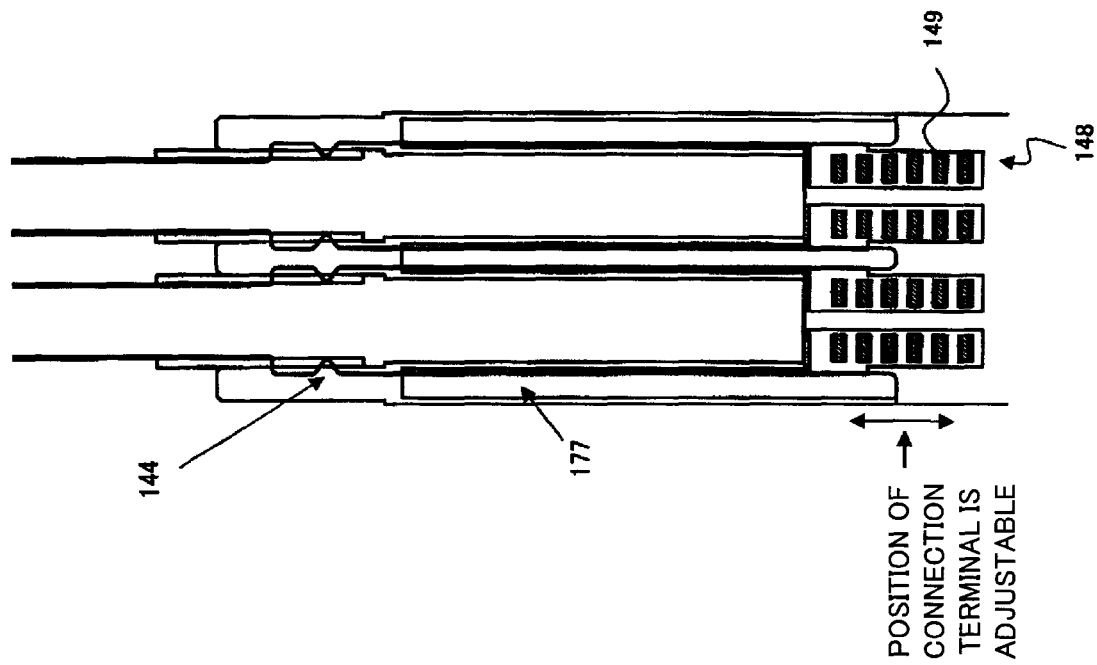
FIG. 19B is a partially enlarged side view of FIG. 18B.
Figure 19A:
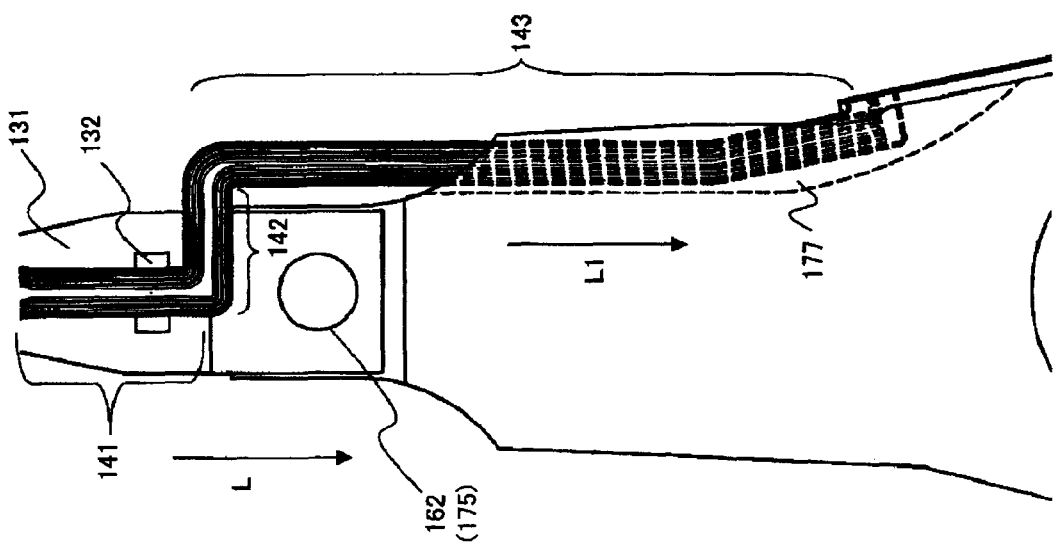
FIG. 19A is a partially enlarged plane view of FIG. 18A.

In FIGS. 1 to 11, the terminal part 148 is a type connected to the main FPC 154 through ultrasonic bonding, but may be a terminal part having six terminals as shown in FIG. 12 or 19B, which will be described later. Here, FIG. 12 is a perspective view corresponding to FIG. 9 in bending the terminal part having six terminals.

The control system 80 includes, as shown in FIG. 13, a controller 81, a memory 82, a power switch 83, a start switch 84a, a stop switch 84b, a reset switch 84c, and a suction pause switch 84d.

Figure 14:
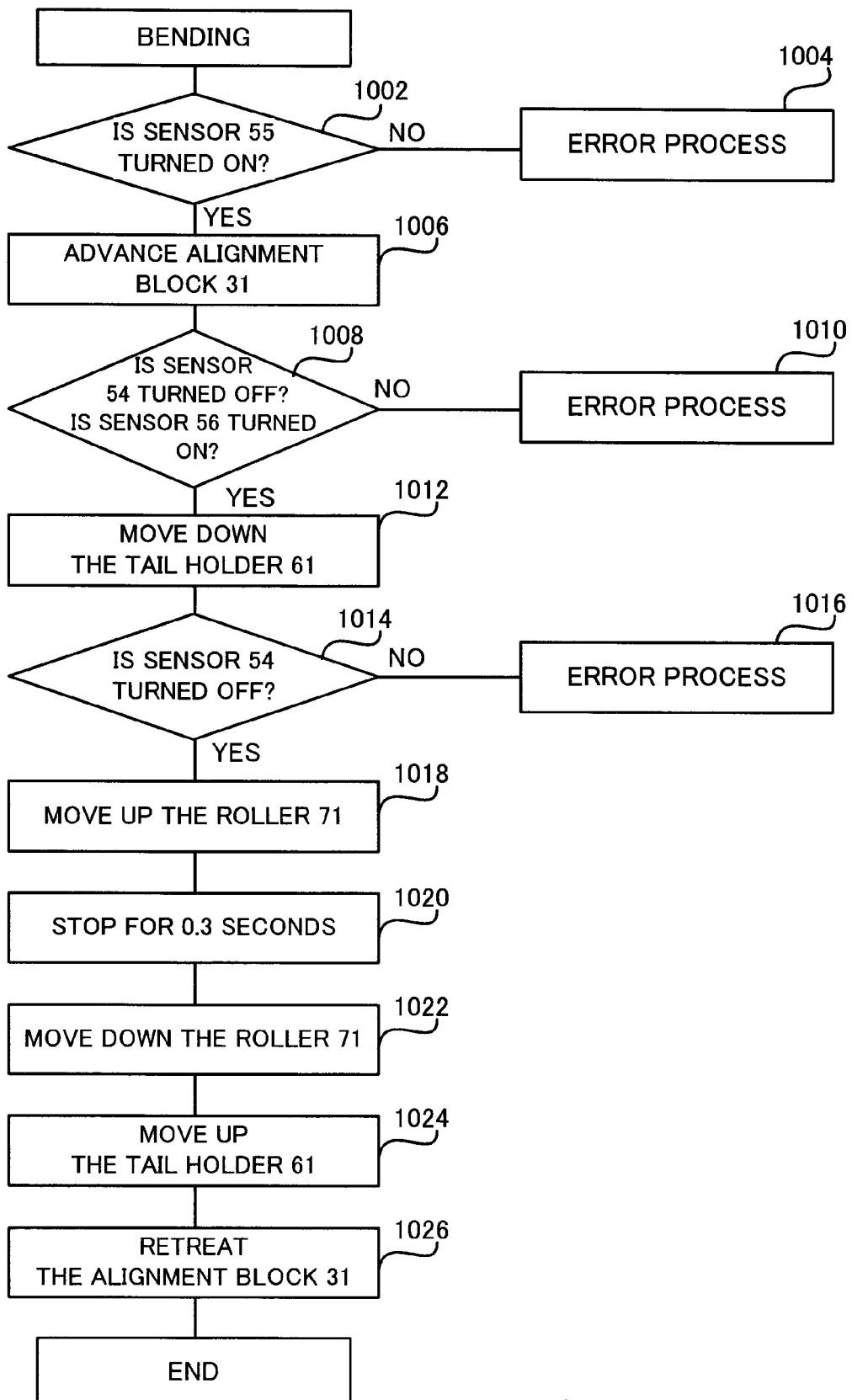
FIG. 14 is a flowchart of the bending action performed by the bending apparatus shown in FIG. 1.

The controller 81 is connected to each of the switches 83 to 84d, the exhaust unit 28, the detectors 54 to 56, a memory 82, and the motor 90. The controller 81 executes a bending action. More specifically, the controller 81 controls a movement of the tail holder 61 to the work table 40 and a movement of the roller 71 to the tail holder 61 based on the detection result of the transmission type photo detector (53, 54). In addition, the controller 81 controls the bending action as described later based on the detection results of the pressure sensor 55 and 56. The memory 82 stores a bending method shown in FIG. 14 to be executed by the controller 81.

When the power switch 83 is pressed, the controller 81 instructs the exhaust 28 to start sucking. When the start switch 84a is pressed, the controller 81 drives the direct acting motor 90. The bending action is varied based on the detection result of the detector 50. The stop switch 84b is pressed for emergency shutdown and in response, the controller 81 pauses the motor 90 and the suction of the exhaust unit 28. The reset switch 84c is pressed after the stop switch 84b is pressed to restore to the original state. When the start switch 84a is subsequently pressed, the bending action is started. The suction pause switch 84d is pressed after the bending is completed and in response, the controller 81 temporarily halts the suction by the exhaust unit 28.

Referring now to FIGS. 2 and 9-15, a description will be given of bending action executed by the controller 81.

Initially, the controller 81 controls the exhaust unit 28 to start sucking, when the power switch 83 is projected. The state shown in FIG. 2 is the initial state. Next, when the start switch 84a is pressed, the controller 81 drives the direct acting motor 90.

Next, the controller 81 determines whether an output of the sensor 55 is turned on (step 1002). When the controller 81 determines that the output of the sensor 55 is turned off (step 1002), the controller 81 provides an error process (step 1004). The error process temporarily halts the operation, and the operation is resumed when the start switch 84 is pressed. Alternatively, when the reset switch 84c is pressed, the restoration to the original state is performed. When the controller 81 determines that the output of the sensor 55 is turned on (step 1002), the controller 81 recognizes that the pin 16 is inserted into the boss hole 162 of the base plate 160. Thereby, the bending starts only when the HGA 110 exists.

Next, the controller 81 maintains the operation of the motor 90. As a result, the alignment block 31 advances (step 1006, P0-P2 in FIG. 15). More specifically, the drive plate 92 moves in the $X_2$ direction shown in FIG. 2, and the cam 35 descends along the guide surface 36a. As a result, the drive shaft 37 rotates counterclockwise in FIG. 2 around the shaft 38a. Therefore, the alignment block 31 connected to the other end of the drive shaft 37 moves in the $X_1$ direction, and the probe pin 33 pushes and moves the long tail 143.

Figure 15:
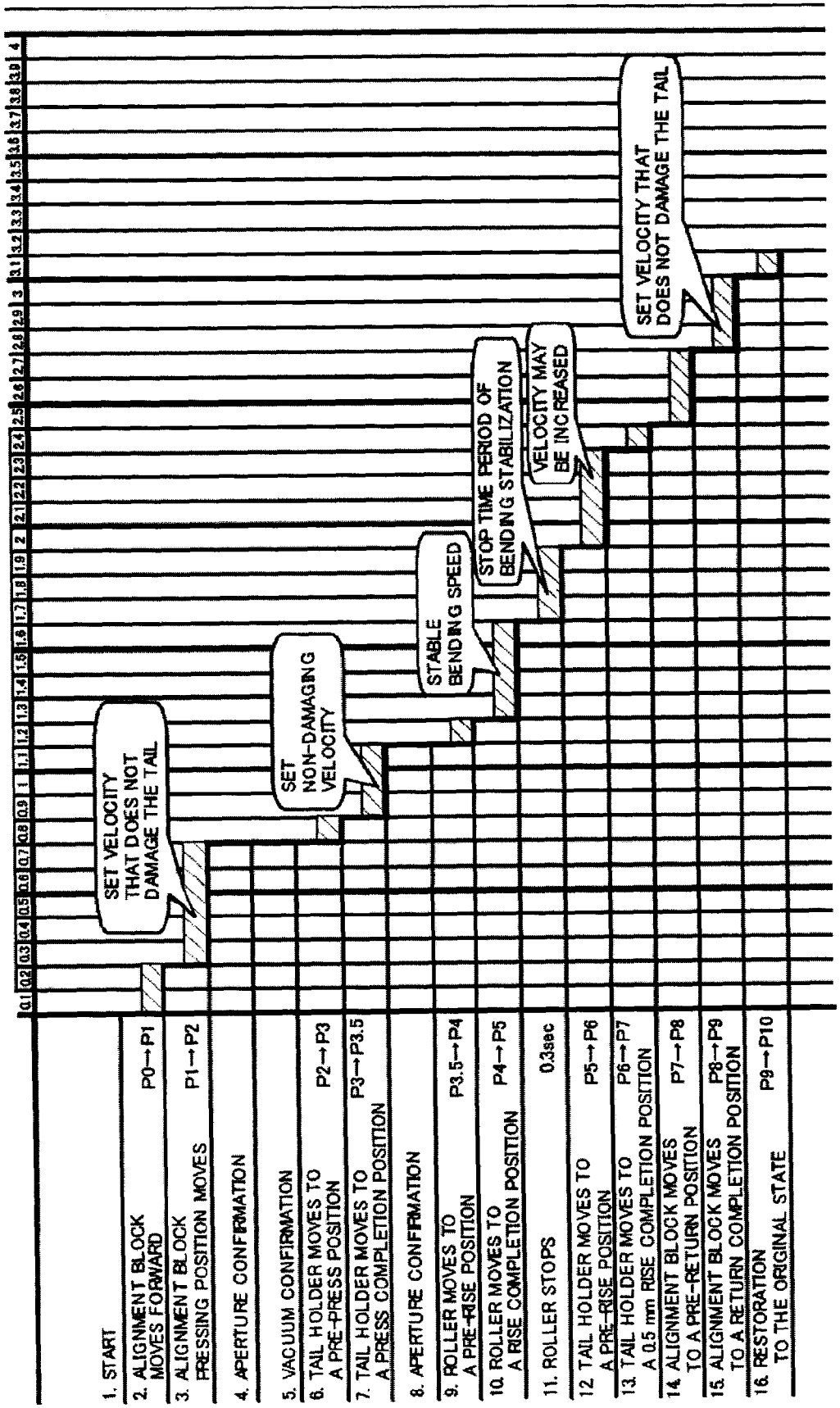
FIG. 15 is a timing chart in the bending action shown in FIG. 14.

Next, the controller 81 determines whether the output of the light receiving part 54 is turned off and the output of the sensor 56 is turned on (step 1008, items 3 and 4 in FIG. 15). When the controller 81 determines that the output of the light receiving part 54 is not turned off and the output of the sensor 56 is not turned on (step 1008), the controller 81 performs the error process (step 1010). The error process is similar to that of the step 1004. When the output of the light receiving part 54 is turned off, a laser beam from the laser 53 is shielded by the long tail 143, as shown in FIG. 7. When the output of the sensor 56 is turned on, as shown in FIG. 8, the long tail 143 is properly attracted onto the suction port 26, as shown in FIG. 8. In this case, the controller 81 maintains the operation of the motor 90. As a consequence, the tail holder 61 is moved down (step 1012, P2 to P3.5).

More specifically, the drive plate 92 is moved in the $X_2$ direction shown in FIG. 2, and the cam 62 is moved down along the guide surface 63a. As a result, the drive shaft 64 is moved in the $Z_1$ direction. Therefore, the tail holder 61 connected to the other end of the drive shaft 64 is moved down.

Next, the controller 81 determines whether the output of the light receiving part 54 is turned off (step 1014, item 8 in FIG. 15). Since the fixture by the tail holder 61 has already been completed, the controller 81 does not consider the output of the sensor 56 but may consider it. When the controller 81 determines that the output of the light receiving part 54 is turned off (step 1014), the controller 81 performs the error process (step 1016). The error process is similar to that of the step 1004. When the controller 81 determines that the output of the light receiving part 54 is turned off (step 1014), the controller maintains the operation of the motor 90. As a result, as shown in FIGS. 9 and 10A, the roller 71 rises (step 1018, P3.5 to P5 in FIG. 15).

More specifically, the drive plate 92 is moved in the $X_2$ direction shown in FIG. 2, and the cam 72 is moved up along the guide surface 73a. As a consequence, the drive shaft 74 is moved in the $Z_2$ direction, and the roller 71 connected to the other end of the drive shaft 74 is moved up. At this time, the roller 71 is forced to the side of the tail holder 61 by the press spring 77.

The roller 71 is halted for 0.3 seconds in the state shown in FIG. 10B, (step 1020, item 11 in FIG. 15). Thereby, the bending state of the terminal part 148 is stabilized. Next, the controller 81 rotates the motor 90 in the reverse direction. As a result, in FIG. 2, the drive plate 92 is moved in the $X_1$ direction. As shown in FIG. 10C, the roller 71 is moved down (step 1022). Next, the controller 81 maintains the operation of the motor 90. As a result, the tail holder 61 is moved up (step 1024, P5-P7 in FIG. 15). The controller 81 continues to maintain the operation of the motor 90. As a result, the alignment block 31 is retreated (step 1026, P7-P9 in FIG. 15). Thereby, the long tail 143 is engaged with the front surface 34a of the return projection and is moved with the alignment block 31 in the $X_2$ direction. As a result, the restoration to the original state is completed (item 16 in FIG. 15). Thereafter, the operator presses the suction pause switch 84d. As a result, the controller 81 temporarily halts the suction by the exhaust part 28, and the operator picks up the base plate 16 out of the pin 16 through the tweezers 16.

Figure 16:
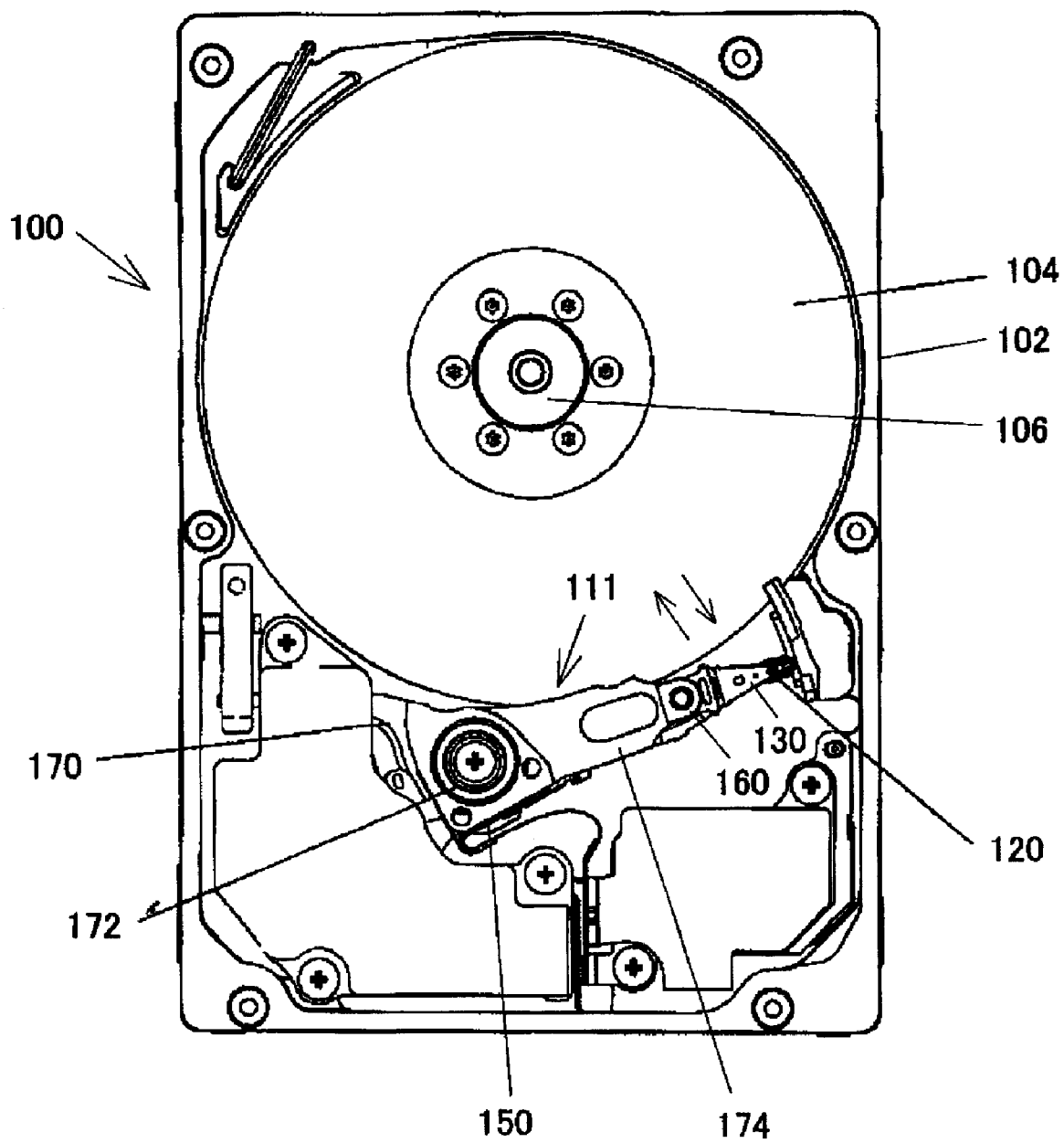
FIG. 16 is a plane view showing an internal structure of the HDD mounted with the bent HGA.

Referring now to FIGS. 16-19B, a description will be given of a connection between the bent terminal part 148 and the main FPC 150. FIG. 16 is a schematic plane view of the internal structure of the HDD 100. The HDD 100 includes, as shown in FIG. 16, one or more magnetic discs 104 each serving as a recording medium, a spindle motor 106, and a HSA 111 in a housing 102. The HSA 111 includes an HGA 110 and a carriage 170 to which the HGA 110 is attached. The HGA 110 includes a suspension 130 configured to support a magnetic head unit 120, a suspension substrate 140, and a base plate 160.

Figure 17:
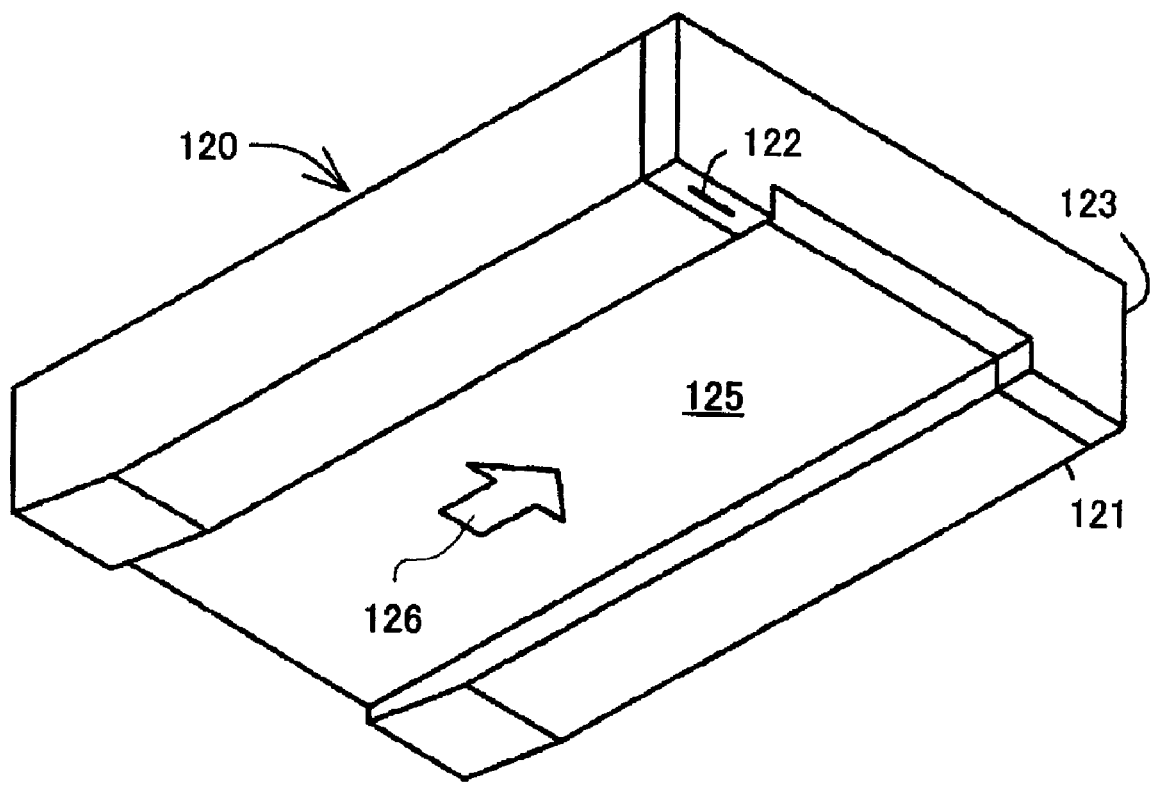
FIG. 17 is an enlarged plane view of a magnetic head unit in the HDD shown in FIG. 15.

The magnetic head unit 120 includes a slider 121, and a head device built-in film 123 that is joined with an air outflow end of the slider 121 and has a read/write head 122. The slider 121 floats above the surface of the disc 104. The head 122 records information in and reproduces the information from the magnetic disc 104. A surface of the slider 121 opposing surface to the magnetic disc 104 serves as a floating surface 125. The floating surface 125 receives an airflow 126 that occurs with rotations of the magnetic disc 104. Here, FIG. 17 is a schematic perspective view of the magnetic head unit 120.

The suspension 130 serves to support the magnetic head unit 120 and to apply an elastic force to the magnetic head unit 120 in the direction of the magnetic disc 104, and is, for example, a stainless-steel suspension. The suspension 130 has a flexure 134 configured to cantilever the magnetic head unit 120, and a load beam (also referred to as a hinge plate or another name) 136 connected to the base plate 160. The load beam 136 has a central spring part so as to apply a sufficient compression force in a Z direction. The load beam 136 includes a rigid proximal end, a central spring part, and a rigid distal end. The load beam 136 contacts the flexure 134 via a projection called a dimple (referred to as a pivot or another name) so that the floating surface 125 can follow the disc's warp and swell and can be always parallel to the disc surface. The magnetic head unit 120 is designed to softly pitch and roll around the dimple.

Figure 18B:
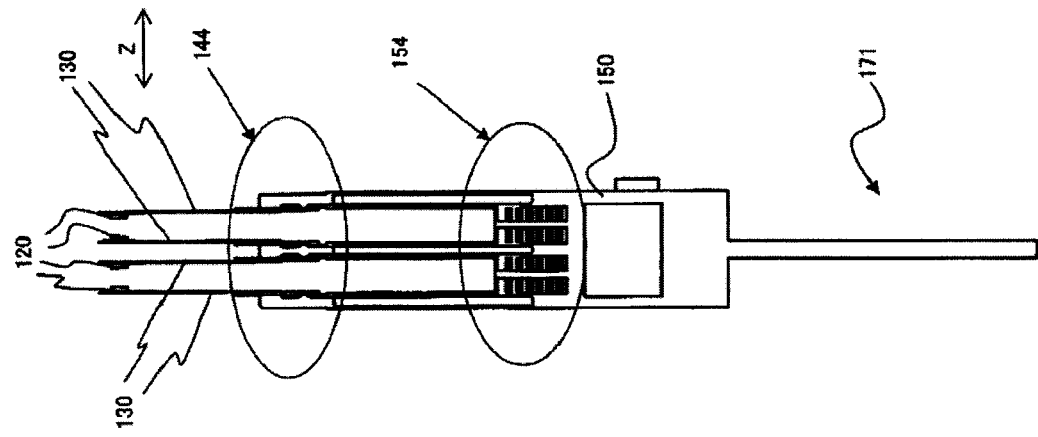
FIGS. 18A and 18B are schematic plane and side views of an HSA shown in FIG. 16.
Figure 18A:
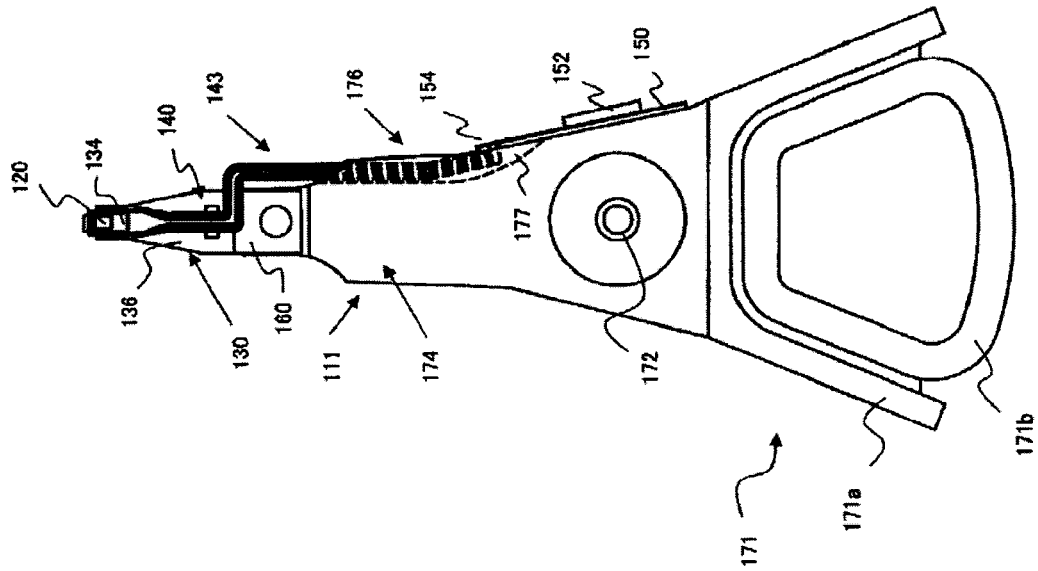

The suspension 130 is also mounted with the suspension substrate 140 that is electrically connected to the magnetic head unit 120, as shown in FIGS. 18A to 19B. FIGS. 18A and 18B are schematic plane and side views of the HSA 111. FIG. 19A is a partially enlarged plane view of FIG. 18A, and FIG. 19B is a partially enlarged side view of FIG. 18B.

The suspension substrate 140 is electrically connected to the head 122 and the main FPC 150, and sends the sense current, write information, and read information. The suspension substrate 140 is welded (fixed) onto the suspension 130 at a welding part 132 on a surface 131 of the suspension 130, onto which the magnetic head unit 120 is mounted.

The suspension substrate 140 includes a base 141, a bent portion 142, a long tail 143, and a terminal part 148 at the tip of the long tail 143.

The base 141 extends in a longitudinal direction L along the center along the surface 131 of the suspension 130 from the magnetic head unit 120. The longitudinal direction L is parallel to a line that connects the center of a shaft 172 and the center of a perforation hole 175 of an arm 174 (or the center of the boss hole 162 in the base plate 160).

The bent portion 142 is bent by 90° from the end of the base 141 toward the outside of the arm 174. The other end of the bent portion 142 is further bent by about 90° along the side surface 176 of the arm 174.

The long tail 143 starts with the other end of the bent portion 142 and ends with the terminal part 148, extending along the side surface 176 of the arm 174. The long tail 143 has an aerial part and a housed part. The aerial part is a part that exposes in air, and the housing part is a part housed in a slit 177 formed in the arm 174. The suspension substrate 140 that includes the long tail 143 has a wiring pattern via an insulation layer, such as polyimide, on a highly or substantially rigid substrate, such as a SUS.

The terminal part 148 is provided on the end of the long tail 143, and bent by 90° around the longitudinal direction of the long tail 143, and soldered with the main FPC 150. The bending apparatus 1 used for this bending. The terminal part 148 includes, as shown in FIG. 19B, totally six terminals 149, i.e., two recording terminals and two reproducing terminals for the head 122, and two floatation-amount controlling terminals.

The long tail 143 has a flexible part 144 near the connection part of the arm 174 with the base plate 160. The flexible part 144 enables the long tail 143 to adjust (extend or reduce) its size in the longitudinal direction L1 along the side surface 176 of the arm 174.

The main FPC 150 has a terminal part 154 to be connected to the terminal part 148. The main FPC 150 supplies a control signal, a signal to be recorded in the disc 104, and power to the suspension substrate 140, and the main FPC 150 receives from the suspension substrate 140 a signal reproduced from the disc 104. The main FPC 150 includes a pre-amplifier IC 152 configured to amplify a variety of types of signals. The terminal part 154 of the main FPC 150 constitutes a structure similar to the terminal part 148 shown in FIG. 19B.

The base plate 160 serves to attach the suspension 130 to the arm 174, and includes a welded section, and a boss (hole) 162. The welded section is laser-welded with the suspension 130. The boss (hole) 162 is a projection that extends perpendicular to the paper plane of FIG. 19A, and swaged with the arm 174.

The carriage 170 serves to rotate or swing the magnetic head unit 120 in arrow directions shown in FIG. 16, and includes a voice coil motor 171, the shaft 172, and the arm 174.

The voice coil motor 171 has a flat coil 171b between a pair of yokes 171a. The flat coil 171b opposes to a magnetic circuit (not shown) provided to the housing 102, and the carriage 170 swings around the shaft 172 in accordance with values of the current that flows through the flat coil 171b. The magnetic circuit includes, for example, a permanent magnet fixed onto an iron plate fixed in the housing 102, and a movable magnet fixed onto the carriage 170.

The shaft 172 is inserted into a hollow cylinder in the carriage 170, and extends perpendicular to the paper plane of FIG. 16 in the housing 102. The center axis of the shaft 172 is the rotating axis of the arm 174.

The arm 174 is an aluminum rigid body, and has the perforation hole 175 at its top, and the slit 177 configured to house part of the long tail 143. The suspension 130 is attached to the arm 174 via the perforation hole 145 and the base plate 160.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A manufacturing apparatus configured to manufacture a head gimbal assembly that includes a head configured to record information in and to reproduce the information from a recording medium, a suspension configured to support the head, and a suspension substrate fixed onto the suspension and connected electrically to the head at one end, the suspension substrate having a terminal part at another end, said manufacturing apparatus comprising:
    a work table used to bend the terminal part of the suspension substrate;
    a suction unit configured to attract the head gimbal assembly;
    a movement unit configured to move a long tail connected to the terminal part of the suspension substrate;
    a stopper against which the long tail that has been moved by the movement unit is butted;
    a transmission type optical sensor configured to detect that the long tail is positioned relative to the stopper by determining whether light that passes a groove provided in the work table is shielded by the long tail;
    a tail holder configured to hold a part of the long tail on the work table;
    a roller configured to compress the terminal part against the tail holder and to bend the terminal part relative to the long tail at a right angle; and
    a controller configured to control, based on a detection result of the transmission type optical sensor, a movement of the tail holder to the work table and a movement of the roller to the tail holder.

2. The manufacturing apparatus according to claim 1, wherein the head gimbal assembly further includes a base plate configured to attach the suspension to an arm configured to drive the suspension,
    wherein the manufacturing apparatus further comprises:
    a fixture block provided near the work table; and
    a pin provided to the fixture block and engaged with a boss hole in the base plate, and
    wherein the suction unit has a first suction port around the pin and is configured to attract the base plate.

3. The manufacturing apparatus according to claim 2, wherein the manufacturing apparatus further includes a pressure sensor configured to detect whether the base plate is mounted onto the first suction port, and
    wherein the controller starts a bending operation when the pressure sensor detects that the base plate is mounted.

4. The manufacturing apparatus according to claim 1, wherein the movement unit includes:
    a probe pin configured to contact the long tail at a pressure set by a compression spring; and
    an alignment block configured to move with the probe pin.

5. The manufacturing apparatus according to claim 4, wherein the suction unit has a second suction port formed in the alignment block.

6. The manufacturing apparatus according to claim 5, wherein the long tail crosses part of the second suction port when the second suction port attracts the long tail.

7. The manufacturing apparatus according to claim 1, wherein the movement unit includes:
    a projection configured to contact the long tail after the long tail is bent; and
    an alignment block configured to move with the projection.

8. The manufacturing apparatus according to claim 1, wherein the stopper is provided on the work table, and
    wherein the suction unit has a third suction port formed in the work table near the stopper and the groove.

9. The manufacturing apparatus according to claim 8, further comprising a pressure sensor configured to detect whether the base plate is mounted onto the third suction port,
    wherein the controller approaches the tail holder to the work table when the pressure sensor detects the base plate.

10. The manufacturing apparatus according to claim 1, wherein each of the tail holder and the roller is made of nonmagnetic cemented carbide.

11. The manufacturing apparatus according to claim 1, further comprising:
    a first cam mechanism configured to move the movement unit relative to the work table, the first cam mechanism including a first cam, a first drive shaft connected to the first cam, and a first guide engaged with the first cam and configured to change a position of the first cam;
    a second cam mechanism configured to move the tail holder relative to the work table, the second cam mechanism including a second cam, a second drive shaft connected to the second cam, and a second guide engaged with the second cam and configured to change a position of the second cam;
    a third cam mechanism configured to move the roller relative to the work table, the third cam mechanism including a third cam, a third drive shaft connected to the third cam, and a third guide engaged with the third cam and configured to change a position of the third cam;
    a direct acting motor; and
    a drive plate driven by the direct acting motor in one direction,
    wherein the first guide, the second guide, and the third guide are mounted onto the drive plate, and simultaneously moved in the same direction by the direct acting motor.

12. The manufacturing apparatus according to claim 1, wherein the controller stops driving the roller for a predetermined time period while the roller is being pressed against the tail holder.

13. A manufacturing method configured to manufacture a head gimbal assembly that includes a head configured to record information in and to reproduce the information from a recording medium, a suspension configured to support the head, and a suspension substrate fixed onto the suspension and connected electrically to the head at one end, the suspension substrate having a terminal part at another end, said manufacturing method comprising:

attracting the head gimbal assembly through a suction unit;

moving a long tail connected to the terminal part of the suspension substrate through a movement unit;

butting the long tail that has been moved by the movement unit against a stopper;

detecting, through a transmission type optical sensor, that the long tail is positioned relative to the stopper by determining whether light that passes a groove provided in a work table is shielded by the long tail;

holding a part of the long tail on a tail holder on the work table;

compressing the terminal part against the tail holder and bending the terminal part relative to the long tail at a right angle on the work table by a roller; and controlling, based on a detection result of the transmission type optical sensor, a movement of the tail holder to the work table and a movement of the roller to the tail holder.

* * * * *